US005738932A

United States Patent [19]

Kondo et al.

[11] Patent Number: 5,738,932

[45] Date of Patent: Apr. 14, 1998

[54] RECORDING MEDIUM, INK-JET RECORDING METHOD USING THE SAME AND PRINT OBTAINED THEREBY, AND DISPERSION AND PRODUCTION PROCESS OF THE RECORDING MEDIUM USING THE DISPERSION

[75] Inventors: Yuji Kondo, Machida; Kyo Miura, Yokohama; Hitoshi Yoshino, Zama; Takeo Eguchi, Tokyo; Hiroshi Tomioka, Matsudo, all of Japan

[73] Assignee: Canon Kabushiki Kaisha, Tokyo, Japan

[21] Appl. No.: 706,534

[22] Filed: Sep. 5, 1996

Related U.S. Application Data

[63] Continuation of Ser. No. 279,100, Jul. 22, 1994, abandoned.

[30] Foreign Application Priority Data

| | | | |
|---|---|---|---|
| Jul. 30, 1993 | [JP] | Japan | 5-189368 |
| Oct. 26, 1993 | [JP] | Japan | 5-267233 |
| Jun. 20, 1994 | [JP] | Japan | 6-137408 |
| Jun. 20, 1994 | [JP] | Japan | 6-137409 |

[51] Int. Cl.$^6$ .......... B32B 3/00

[52] U.S. Cl. .......... 428/195; 347/105; 428/211; 428/328; 428/418.2; 428/478.4

[58] Field of Search .......... 428/195, 328, 428/329, 473, 211, 478.2, 478.4, 478.8, 323; 347/105

[56] References Cited

U.S. PATENT DOCUMENTS

| | | | |
|---|---|---|---|
| 2,761,791 | 9/1956 | Russel | 117/34 |
| 2,983,611 | 5/1961 | Allen et al. | 96/111 |
| 3,017,280 | 1/1962 | Yudelson | 106/125 |
| 3,100,704 | 8/1963 | Coles et al. | 96/111 |
| 4,001,024 | 1/1977 | Dittman et al. | 96/87 R |
| 4,202,870 | 5/1980 | Weber et al. | 423/630 |
| 4,242,271 | 12/1980 | Weber et al. | 260/448 |
| 4,379,804 | 4/1983 | Eisele et al. | 428/332 |
| 4,474,847 | 10/1984 | Schroder et al. | 428/323 |
| 4,649,064 | 3/1987 | Jones | 427/256 |
| 4,879,166 | 11/1989 | Misuda et al. | 428/212 |
| 5,104,730 | 4/1992 | Misuda et al. | 428/304.4 |
| 5,188,931 | 2/1993 | Marinelli et al. | 430/539 |
| 5,189,007 | 2/1993 | Aihara et al. | 503/207 |
| 5,372,884 | 12/1994 | Abe et al. | 428/331 |

FOREIGN PATENT DOCUMENTS

| | | | |
|---|---|---|---|
| 0500021 | 8/1992 | European Pat. Off. | 428/195 |
| 3024205 | 1/1982 | Germany | 428/195 |
| 52-53012 | 4/1977 | Japan | 428/195 |
| 53-49113 | 5/1978 | Japan | 428/195 |
| 54-59936 | 5/1979 | Japan | 428/195 |
| 55-5830 | 1/1980 | Japan | 428/195 |
| 55-51583 | 4/1980 | Japan | 428/195 |
| 55-146786 | 11/1980 | Japan | 428/195 |
| 2276670 | 11/1990 | Japan | 428/195 |
| 3-72460 | 11/1991 | Japan | 428/195 |
| 4-37576 | 2/1992 | Japan | 428/195 |
| 4-67985 | 3/1992 | Japan | 428/195 |
| 4-67986 | 3/1992 | Japan | 428/195 |
| 5-16517 | 1/1993 | Japan | 428/195 |
| 5-32037 | 2/1993 | Japan | 428/195 |
| 5-16015 | 3/1993 | Japan | 428/195 |

OTHER PUBLICATIONS

Derwent Association, No. 86-004825 for JP-A-60232990.
S. Brunauer, the Journal of the American Chemical Society, vol. LX, pp. 309–319 (1938).
J. McBain, the Journal of the American Chemical Society, vol. LVII, pp. 699–700 (1935).
E. Barrett, et al. the Journal of the Americal Chemical Society, vol. LXXIII, pp. 373–380 (1951).
J. Rocek, et al., Applied Catalysis, 74 (1991) pp. 29–36.
J. Rocek, et al., Collect. Czech. Chem. Commun. (vol. 56) (1991) pp. 1253–1262; J. Menezo, et al., Read. Kinet. Catal. Lett., vol. 46 No. 1, (1992) pp. 1–6.

*Primary Examiner*—Bruce H. Hess
*Attorney, Agent, or Firm*—Fitzpatrick, Cella, Harper & Scinto

[57] ABSTRACT

Disclosed herein is a recording medium having an ink-receiving layer which comprises an alumina hydrate and acid-processed or alkali-processed gelatin.

43 Claims, 1 Drawing Sheet

RECORDING MEDIUM, INK-JET RECORDING METHOD USING THE SAME AND PRINT OBTAINED THEREBY, AND DISPERSION AND PRODUCTION PROCESS OF THE RECORDING MEDIUM USING THE DISPERSION

This application is a continuation of application Ser. No. 08/279,100 filed Jul. 22, 1994, now abandoned.

BACKGROUND OF THE INVENTION

1. Field of the Invention

The present invention relates to a recording medium suitable for use in recording using water-based inks, an ink-jet recording method using such a recording medium and a print obtained thereby. In particular, this invention relates to a recording medium which can provide images high in optical density and resolution and bright in color tone, has excellent ink-absorbing capacity, causes no change in tint, and is good in color reproducibility and high in gloss, an ink-jet recording method using such a recording medium and a print obtained thereby.

The present invention also relates to a dispersion, which is suitable for use in production of the recording medium, and a production process of the recording medium using such a dispersion.

2. Related Background Art

In recent years, an ink-jet recording system, in which minute droplets of an ink are flown by any one of various working principles to apply them to a recording medium such as paper, thereby make a record of images, characters and/or the like, has been quickly spread as a recording apparatus for various images in various applications including information instruments because it has features that recording can be conducted at high speed and with a low noise, color images can be formed with ease, recording patterns are very flexible, and development and fixing process are unnecessary. Further, it begins to be applied to a field of recording of full-color images because images formed by a multi-color ink-jet recording system are comparable in quality with multi-color prints by a plate making system and photoprints by a color photographic system, and such records can be obtained at lower cost than the usual multi-color prints and photoprints when the number of copies is small. With the improvement in recordability, such as speeding up and high definition of recording, and full-coloring of images, recording apparatus and recording methods have been improved, and recording media have also been required to have higher properties.

In order to satisfy such requirements, a wide variety of recording media have heretofore been proposed. For example, Japanese Patent Application Laid-Open No. 52-53012 discloses paper for ink-jet, in which a base paper web low in sizing degree is impregnated with a surface coating. Japanese Patent Application Laid-Open No. 53-49113 discloses paper for ink-jet, in which a sheet 1 containing urea-formalin resin powder therein is impregnated with a water-soluble polymer. Japanese Patent Application Laid-Open No. 55-5830 discloses paper for ink-jet recording, in which a coating layer having good ink absorptiveness is provided on a surface of a base material. Japanese Patent Application Laid-Open No. 55-51583 discloses that amorphous silica is used as a pigment in a coating layer. Japanese Patent Application Laid-Open No. 55-146786 discloses that a coating layer formed of a water-soluble polymer is used.

In recent years, recording sheets having a layer using an alumina hydrate of a boehmite structure have also been proposed and are disclosed in, for example, U.S. Pat. Nos. 4,879,166 and 5,104,730, and Japanese Patent Application Laid-Open Nos. 2-276670, 4-37576 and 5-32037.

The recording media using these alumina hydrates have advantages that since the alumina hydrates have a positive charge, a dye in ink is well fixed and an image good in coloring is hence provided, that there are no problems of bronzing of black ink and light fastness, which have heretofore been caused by the use of silica compounds, and moreover that they provide images, in particular, full-color images having better quality than those formed on the conventional recording media. In order to have a recording medium fully exhibit the advantages inherent in these alumina hydrates, it is however necessary to improve the following respects:

1) There is a problem that the solids concentration of a dispersion containing the alumina hydrate cannot be increased because the viscosity of the dispersion increases with time, resulting in a failure to apply it. As a measure for solution of this problem, Japanese Patent Application Laid-Open No. 4-67986 discloses a process in which the polymerization degree of a polymer as a binder is lowered. However, this process involves problems of defective appearance such as cracking in an ink-receiving layer, reduction in water fastness, and the like, and hence still requires a further improvement.

2) There is a problem that since the viscosity of a dispersion containing the alumina hydrate is high, its solids concentration cannot be increased. As a measure for the solution of the problem, Japanese Patent Application Laid-Open No. 4-67985 discloses a process in which an acid such as a monocarboxylic acid is added as a dispersant. However, this process is accompanied by productive problems that offensive odor is given, and corrosion is caused.

3) In order to improve ink absorptiveness and resolution of images, U.S. Pat. No. 5,104,730, Japanese Patent Publication No. 3-72460 and Japanese Patent Application Laid-Open No. 4-37576 each disclose a process in which an ink-receiving layer of a two or more multi-layer structure is formed. However, the process involves a problem that coating and drying must be conducted at least twice for forming the ink-receiving layer, and so the number of processes increases. In addition, since the physical property values of the individual layers are different from each other, there are also problems of changes with time, defective appearance such as cracking in the ink-receiving layer, and separation and peeling of the layers from each other upon printing or the like.

4) An investigation as to the conventional techniques of the references described above by the present inventors has revealed that the ink absorptiveness and resolution depend on the thickness of the ink-receiving layer, and the provision of satisfactory ink absorptiveness and resolution requires to make the thickness at least about 15 μm, preferably at least 20 μm.

It is not easy to effectively obtain a satisfactory ink-receiving layer having such a thickness in material systems in the conventional techniques of the references, i.e., an alumina hydrate and a water-soluble binder such as polyvinyl alcohol.

For example, there is a process in which coating is repeated many times to form a thick ink-receiving layer.

However, this process involves the same problems as described in 3). Besides, a process for obtaining a thick ink-receiving layer by one coating is accompanied by problems to be improved that since it requires long-time drying, and coating speed hence becomes extremely slow, that productivity is lowered, resulting in increase of cost, and that since coating time becomes longer, the viscosity of a dispersion increases with time, and the same problem as described in 1) is hence be offered. A coating machine equipped with a long drying oven may also be required in some cases. Further, there is a process in which the solids concentration of a dispersion is increased to conduct coating. This process however involves the same problems to be improved as described in 1) and 2).

5) A dispersion of the alumina hydrate is added with an organic acid such as a monocarboxylic acid disclosed in Japanese Patent Application Laid-Open No. 4-67985 or an inorganic acid in an amount of generally several tens percent for keeping its good dispersion state. An ink-receiving layer formed from such alumina hydrate involves a problem that the tint of an ink printed is changed by the influence of this acid.

6) As a measure for solution of the problem of 5), there is a process according to improvement of inks to be used. However, such a process is extremely difficult to perform in circumstances, and requires to investigate over a long period of time. More specifically, inks used in an ink-jet recording system are yellow, magenta, cyan and black inks. In order to provide color images excellent in color reproducibility, the molecular structures of a great number of dyes are designed for making the maximum absorption spectrum of the individual inks a spectrum range suitable for their corresponding colors. This design requires complicated processes and involves problems of conditions and yield under circumstances. In addition, when the realization of good color reproducibility is attempted by improvement in dyes, it is often difficult to achieve a maximum color density.

The present inventors have carried out an extensive investigation as to such problems. As a result, it has been found that since a color image according to ink-jet recording is obtained with dyeing dyes, which are separately contained in inks printed on a recording medium, fixed on an ink-receiving layer of the recording medium, the properties of this recording medium greatly control the quality of the resulting color image. It has been also revealed that even the realization of excellent color reproducibility is permitted by the improvement of the recording medium. Even if good tints are achieved in individual inks by the improvement of the inks, a good color image cannot be obtained if the tints vary depending on the recording medium used. Besides, when inks are prepared according to recording media, inks must be changed according to the individual recording media. Accordingly, a recording medium capable of faithfully reproducing the tints of inks is most preferred. In order to achieve good color reproducibility, it is therefore necessary only to improve recording media.

However, there is no literature making mention of the improvement of color reproducibility by the improvement of recording media so far as the present inventors know.

SUMMARY OF THE INVENTION

The present invention has thus been made with a view toward solving the above problems and has as its object the provision of a recording medium which can provide images high in optical density and resolution and bright in color tone, has good ink absorptiveness, causes no change in tint, and is good in color reproducibility and high in gloss, an ink-jet recording method using this recording medium and a print obtained thereby.

Another object of the present invention is to provide a dispersion, which is suitable for use in production of the recording medium, and a production process of the recording medium using such a dispersion.

The present inventors have carried out an extensive investigation with a view toward solving the above-described problems. As a result, it has been found that when a specific alumina hydrate and a natural polymer having gel-forming ability or a derivative thereof, in particular, specific acid-processed or alkali-processed gelatin, are used as a pigment and a binder, respectively, thereby making effective use of sensitive sol-gel converting ability of the acid-processed or alkali-processed gelatin and thixotropic property of a dispersion of the alumina hydrate/the acid-processed or alkali-processed gelatin, a thick ink-receiving layer can be formed stably with good productivity, which has heretofore been difficult to achieved, and a recording medium having an ink-receiving layer, which satisfies good ink absorptiveness, provides images having satisfactory resolution and high optical density and exhibits good color reproducibility, can hence be obtained, thus leading to completion of the present invention.

According to the present invention, there is thus provided a recording medium having an ink-receiving layer which comprises an alumina hydrate and acid-processed gelatin.

According to the present invention, there is also provided a recording medium having an ink-receiving layer which comprises an alumina hydrate and alkali-processed gelatin.

According to the present invention, there is further provided a dispersion obtained by dispersing an alumina hydrate and acid-processed gelatin in water, wherein the dispersion has a thixotropic index (TI) of 1.1 to 5.0.

According to the present invention, there is still further provided a dispersion obtained by dispersing an alumina hydrate and alkali-processed gelatin in water, wherein the dispersion has a thixotropic index (TI) of 1.1 to 5.0.

According to the present invention, there is yet still further provided a dispersion comprising an alumina hydrate, acid-processed gelatin and an alkaline earth metal in an amount of 100 to 3,000 ppm based on the acid-processed gelatin.

According to the present invention, there is yet still further provided a process for producing a recording medium, which comprises applying the dispersion described above to a base material by means of a system selected from kiss coating, extrusion, slide hopper and curtain coating systems.

According to the present invention, there is yet still further provided an ink-jet recording method comprising ejecting minute droplets of an ink from an orifice to apply the droplets to a recording medium, thereby conducting printing, wherein the recording medium described above is used as the recording medium.

According to the present invention, there is yet still further provided an ink-jet recording method comprising ejecting minute droplets of an ink from an orifice to conduct printing, wherein the method satisfies the following relationship:

$$|\lambda 1-\lambda 2| \leqq 30\ nm$$

wherein λ1 denotes the maximum absorption spectrum of the ink, and λ2 is the maximum absorption spectrum of an area printed with the ink on a recording medium.

According to the present invention, there is yet still further provided a print obtained by conducting printing with ink dots, wherein a glossiness Gs1 (60) of a non-printed area and a glossiness Gs2 (60) of a printed area are both at least 40 as measured in accordance with JIS Z 8741.

According to the present invention, there is yet still further provided a print obtained by conducting printing with ink dots, wherein the print satisfies the following relationship:

$$|Gs1(60)-Gs2(60)|\leqq 20$$

wherein Gs1 (60) and Gs2 (60) denote a glossiness of a non-printed area and a glossiness of a printed area, respectively, as measured in accordance with JIS Z 8741.

DESCRIPTION OF THE PREFERRED EMBODIMENTS

The preferred embodiments of the present invention will hereinafter be described.

Figure 1:
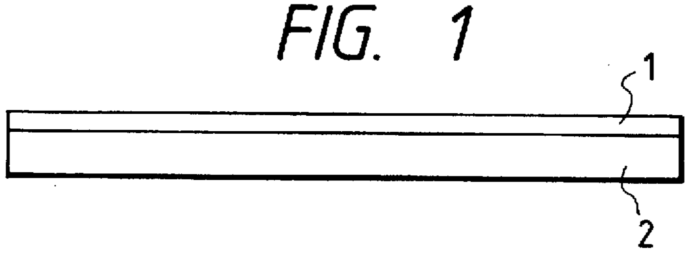
FIG. 1 is a cross-sectional view illustrating a recording medium according to an embodiment of the present invention.

Each of the recording media according to the present invention is constituted by forming an ink-receiving layer composed principally of an alumina hydrate as a pigment and a binder on a base material as illustrated in FIG. 1. The alumina hydrate is most preferable as a material used in the ink-receiving layer because it has a positive charge, so that a dye in an ink is well fixed and an image good in coloring is hence provided, and moreover there are no problems of bronzing of a black ink and light fastness, which have heretofore been caused by the use of silica compounds.

As the binder useful in the practice of the present invention, is used a water-soluble polymer having gel-forming ability [which is a nature that its aqueous solution (sol) is gelled into the form of jelly by cooling the solution] and being able to be crosslinked with a hardening agent. As particular examples thereof, may be mentioned gelatin, agar, sodium alginate, kappa-carrageenan, lambda-carrageenan, iota-carrageenan, furcellaran and the like. In particular, gelatin is preferred in that its aqueous solution can sensitively undergo sol-gel conversion according to change of temperature.

This sol-gel converting ability (setting ability) of gelatin permits formation of an ink-receiving layer having a satisfactory thickness with good productivity. Even if a water-soluble polymer conventionally used and having no gel-forming ability, for example, polyvinyl alcohol is used as a binder, it is not easy to obtain an ink-receiving layer having a thickness of 15 to 20 μm or more because a dispersion undergoes leveling and sags. Gelatin is also preferred from the viewpoint of safety.

As the prior art in which gelatin is used in an ink-receiving layer of an ink-jet recording sheet, may be mentioned Japanese Patent Application Laid-Open No. 5-16517, Japanese Patent Publication No. 3-72460, Japanese Patent Application Laid-Open No. 2-289375 and U.S. Pat. No. 4,379,804. In all these publications, the gelatin used therein only has a function of absorbing a solvent in an ink, which is essentially different from the function of the gelatin used in the present invention.

The gelatin preferably used in the present invention is prepared by a treatment with hydrochloric acid or the like in a preparation process from collagen (ossein) subjected to a deliming process using pigskin, bovine born or the like as a raw material, and is called acid-processed gelatin or acid-treated gelatin. Besides the acid-processed gelatin prepared by the above-described treatment, examples of the acid-processed gelatin used in the present invention include low-molecular-weight acid-processed gelatin obtained by hydrolyzing or enzymolyzing the acid-processed gelatin prepared by the above-described treatment and chemically modified acid-processed gelatins such as phthalated gelatin, acylated gelatin, phenyl-carbamylated gelatin, acetylated gelatin, succinated gelatin, carboxy-modified gelatin and the like.

Alternatively, the gelatin preferably used in the present invention is prepared by a treatment with lime water in a preparation process from collagen (ossein) subjected to a deashing process using pigskin, bovine born or the like as a raw material, and is called alkali-processed gelatin or alkali-treated gelatin. Besides the alkali-processed gelatin prepared by the above-described treatment, examples of the alkali-processed gelatin used in the present invention include low-molecular-weight alkali-processed gelatin obtained by hydrolyzing or enzymolyzing the alkali-processed gelatin prepared by the above-described treatment and chemically modified alkali-processed gelatins such as phthalated gelatin, acylated gelatin, phenyl-carbamylated gelatin, acetylated gelatin, succinated gelatin, carboxy-modified gelatin and the like.

The present inventors have carried out an extensive investigation as to the acid-processed and alkali-processed gelatins. As a result, it has been found that acid-processed and alkali-processed gelatins having physical properties, such as molecular weight within specific ranges, are particularly preferred because they have good affinity for the alumina hydrate, which will be described subsequently, and permits the formation of a satisfactory ink-receiving layer suitable for use in an ink-jet recording method. There is no example making mention of physical property ranges of gelatin suitable for use as a binder for the specific alumina hydrate so far as the present inventors know. The physical properties of the acid-processed and alkali-processed gelatins preferably used in the present invention will hereinafter be mentioned and described.

Acid-processed gelatin

1) Weight average molecular weight, number average molecular weight

Such molecular weights can be determined by liquid chromatography. The weight average molecular weight (Mw) is preferably 200,000 down to 20,000, more preferably 180,000 down to 20,000, most preferably 170,000 down to 22,000. The number average molecular weight (Mn) is preferably 100,000 down to 10,000, more preferably 85,000 down to 14,000. A ratio (Mw/Mn) of the weight average molecular weight to the number average molecular weight is preferably 1.0 to 3.5, more preferably 1.2 to 3.4.

If these values exceed the upper limits of these ranges, the viscosity of a dispersion of the alumina hydrate and the acid-processed gelatin becomes high, and so a measure is required in coating. Insoluble matter may be recognized in some cases. If the values are lower than the lower limits of these ranges on the other hand, the gelatin becomes a failure to gel, or if it is gelled, the gel is very soft and near liquid, and so a dispersion containing such a gelatin undergoes leveling and sags. Therefore, a measure is required to form a thick ink-receiving layer. In addition, since the dispersion becomes low in film-forming property, the resulting ink-receiving layer tends to crack before and/or after printing.

2. Jelly strength

The jelly strength can be measured by means of a jelly tester, and is preferably within a range of from 400 down to 1, more preferably from 370 down to 1, most preferably from 350 down to 2.

If the jelly strength exceeds the upper limit of the above range, the viscosity of a dispersion of the alumina hydrate and the acid-processed gelatin becomes extremely high, and so a measure is required in coating, and insoluble matter may be recognized in some cases. If the jelly strength is lower than the lower limit of the above range on the other hand, the gelatin becomes a failure to gel into the form of jelly, or if it is gelled into the jelly form, the gel is very soft and near liquid, and so a dispersion containing such a gelatin undergoes leveling and sags. Therefore, a measure is required to form a thick ink-receiving layer.

3) pH value and isoionic point

The pH value is measured by a pH meter, and is preferably within a range of from 9.0 down to 5.5, more preferably from 8.5 down to 5.5. The isoionic point is determined by passing a solution of the acid-processed gelatin through a cation exchange resin and an anion exchange resin and then measuring the pH of the thus-treated solution by a pH meter, and is preferably within a range of from 9.5 down to 5.5, more preferably from 9.5 down to 5.8.

The relationship between pH and isoionic point of the gelatin is preferably satisfied by the formula:

$$(pH \text{ value } -0.1) \leqq \text{isoionic point.}$$

If the gelatin does not satisfy this relationship, the stability of the gelatin in the state of a solution becomes lowered, and so its hydrolysis is allowed to progress with time, resulting in a failure to obtain the fixed physical property values, for example, the fixed viscosity for a mixed dispersion of the alumina hydrate and the acid-processed gelatin. Therefore, the physical properties, for example, thickness, pore radius and pore volume, of an ink-receiving layer obtained by coating and drying of the dispersion vary. It is hence difficult to provide the ink-receiving layer in the stable form.

The physical property values as to the items 1) to 3) are measured in accordance with the respective methods prescribed by the PAGI method (testing method for photographic gelatin, 1992), and their details will be described in Examples.

4) Swelling rate

The swelling rate in the present invention is calculated by (weight of a swelling solvent/weight of the acid-processed gelatin)×100 (details will be described in Examples), and acid-processed gelatin the swelling rate with water of which is at least 500%, preferably 500 to 5,000%, more preferably 700 to 4,000% can be used.

Acid-processed gelatin the swelling rate with ethylene glycol of which is at least 300%, preferably 300 to 2,000%, more preferably 400 to 1,500% is also preferred.

An ink for ink-jet recording comprises a dye and a solvent, and the most part of the solvent is water. However, a high-boiling solvent is generally contained in a small amount. For example, polyhydric alcohols such as ethylene glycol and diethylene glycol are used.

It has heretofore been known that water-absorbing resins are used as ink-receiving layers for recording media. However, they have exhibited sufficient absorptiveness and swell characteristics to water, while their absorptiveness and swell characteristics to ethylene glycol have been extremely low. The acid-processed gelatin used in the present invention exhibits good absorptiveness and swell characteristics to both water and ethylene glycol. In this invention, this acid-processed gelatin also has an effect of contributing to the improvement of ink absorptiveness together with pores of the alumina hydrate which will be described subsequently.

5) Zeta potential

The surface potential of the acid-processed gelatin can be determined by a zeta potential analyzer. The zeta-potential is preferably at least −15 mV, more preferably at least −10 mV as measured in the form of a 0.1% solution.

If the zeta-potential is below this limit, the viscosity of a dispersion of the alumina hydrate and the acid-processed gelatin becomes extremely high though its reason is not clarified, and so a measure is required in coating, and insoluble matter may be recognized in some cases.

The above-described acid-processed gelatins may be used either singly or in any combination thereof.

Alkali-processed gelatin

1) Weight average molecular weight, number average molecular weight

Such molecular weights can be determined by liquid chromatography. The weight average molecular weight (Mw) is preferably 100,000 down to 5,000, more preferably 95,000 down to 7,000. The number average molecular weight (Mn) is preferably 65,000 down to 5,000, more preferably 50,000 down to 8,000. A ratio (Mw/Mn) of the weight average molecular weight to the number average molecular weight is preferably 0.5 to 3.0, more preferably 0.6 to 2.7.

If these values exceed the upper limits of these ranges, the viscosity of a dispersion of the alumina hydrate and the alkali-processed gelatin becomes high, and so a measure is required in coating. Insoluble matter may be recognized in some cases. If the values are lower than the lower limits of these ranges on the other hand, the gelatin becomes a failure to gel, or if it is gelled, the gel is very soft and near liquid, and so a dispersion containing such a gelatin undergoes leveling and sags. Therefore, a measure is required to form a thick ink-receiving layer. In addition, since the dispersion becomes low in film-forming property, the resulting ink-receiving layer has a tendency to offer a problem that it tends to crack before and/or after printing.

2. Jelly strength

The jelly strength is preferably within a range of from 300 down to 1, more preferably from 250 down to 1, most preferably from 200 down to 2.

If the jelly strength exceeds the upper limit of the above range, the viscosity of a dispersion of the alumina hydrate and the alkali-processed gelatin becomes extremely high, and so a measure is required in coating, and insoluble matter may be recognized in some cases. If the jelly strength is lower than the lower limit of the above range on the other hand, the gelatin becomes a failure to gel into the form of jelly, or if it is gelled into the jelly form, the gel is very soft and near liquid, and so a dispersion containing such a gelatin undergoes leveling and sags. Therefore, a measure is required to form a thick ink-receiving layer.

3) pH value and isoionic point

The pH value is preferably within a range of from 4.5 to 7.0, more preferably from 4.8 to 6.8. The isoionic point is determined by passign a solution of the alkali-processed gelatin through a cation exchange resin and an anion exchange resin and then measuring the pH of the thus-treated solution by a pH meter, and is preferably within a range of from 4.1 to 6.0, more preferably from 4.5 to 5.5.

The relationship between pH and isoionic point of the gelatin is preferably satisfied by the formula $pH$ value≧(the isoionic point−0.1).

If the gelatin does not satisfy this relationship, the stability of the gelatin in the state of a solution becomes lowered, and so its hydrolysis is allowed to progress with time, and it is hard to obtain the fixed physical property values, for example, the fixed viscosity for a mixed dispersion of the alumina hydrate and the alkali-processed gelatin. Therefore, the physical properties, for example, thickness, pore radius and pore volume, of an ink-receiving layer obtained by coating and drying of the dispersion vary. It is hence difficult to provide the ink-receiving layer in the stable form.

The physical property values as to the items 1) to 3) are measured in accordance with the respective methods prescribed by the PAGI method (testing method for photographic gelatin, 1992), and their details will be described in Examples.

4) Swelling rate

The swelling rate in the present invention is calculated by (weight of a swelling solvent/weight of the alkali-processed gelatin)×100 (details will be described in Examples), and alkali-processed gelatin the swelling rate in water of which is at least 500% preferably 500 to 5,000%, more preferably 700 to 4,000% can be used. Alkali-processed gelatin the swelling rate in ethylene glycol of which is preferably 300 to 2,000%, more preferably 400 to 1,500% is also preferred.

An ink for ink-jet recording comprises a dye and a solvent, and the most part of the solvent is water. However, a high-boiling solvent is generally contained in a small amount. For example, polyhydric alcohols such as ethylene glycol and diethylene glycol are used.

It has heretofore been known that water-absorbing resins are used as ink-receiving layers for recording media. However, they have exhibited sufficient absorptiveness and swell characteristics to water, while their absorptiveness and swell characteristics to ethylene glycol have been extremely low. The alkali-processed gelatin used in the present invention exhibits good absorptiveness and swell characteristics to both water and ethylene glycol. In this invention, this alkali-processed gelatin also has an effect of contributing to the improvement of ink absorptiveness together with pores of the alumina hydrate which will be described subsequently.

Zeta potential

The zeta-potential of the alkali-processed gelatin is preferably at most 0 mV as measured in the form of a 0.1% solution.

If the zeta-potential is below this limit, the viscosity of a dispersion of the alumina hydrate and the alkali-processed gelatin becomes extremely high though its reason is not clarified, and so a measure is required in coating, and insoluble matter may be recognized in some cases.

The above-described alkali-processed gelatins may be used either singly or in any combination thereof. Alternatively, the alkali-processed gelatin may be used in combination with the acid-processed gelatin.

In addition, gelatin having a weight average molecular weight lower than 20,000 and/or various kinds of water-soluble polymers may also be used in combination with the above-described gelatins for purposes of viscosity control, improvement in adhesive property and film strength, and the like. The amount of such compounds may be optional within limits not impeding the formation of the satisfactory ink-receiving layer. Although the amount cannot be unconditionally said because it may vary according to conditions such as the kinds of substances used, it is within a range of from about 3% to about 35% based on the total amount of the binder.

As specific examples of the water-soluble polymers usable in combination, may be mentioned natural polymers such as starch, oxidized starch, starch acetate, starch, amine, carboxystarch, starch dialdehyde, cationic starch, dextrin, casein, pullulan, dextran, methyl cellulose, ethyl cellulose, propyl cellulose, ethylmethyl cellulose, carboxymethyl cellulose, hydroxyethyl cellulose, hydroxypropyl cellulose, gum arabic, tragacanth gum, karaya gum, echo gum, locust bean gum, albumin, chitin and saccharoid, and derivatives thereof; vinyl polymers such as polyvinyl alcohol, cationically modified polyvinyl alcohol, anionically modified polyvinyl alcohol, silanol-modified polyvinyl alcohol, polyvinyl pyrrolidone, polyvinyl pyridinium, polyvinyl imidazole and polyvinyl pyrazole, and derivatives thereof; acrylic group-containing polymers such as polyacrylamide, polydimethyl aminoacrylate, polyacrylic acid and salts thereof, acrylic acid-methacrylic acid copolymers and salts thereof, polymethacrylic acid and salts thereof, and acrylic acid-vinyl alcohol copolymers and salts thereof; latices such as SBR latex, NBR latex, methyl methacrylate-butadiene copolymers and ethylene-vinyl acetate copolymers; polyethylene glycol; polypropylene glycol; polyethylene imine; polymaleic anhydride and maleic anhydride copolymers; and the like. One or more of these compounds may be used in combination with the acid-processed or alkali-processed gelatin.

The mixing ratio by weight of the alumina hydrate to the binder comprising the acid-processed or alkali processed gelatin may be optionally selected from a range of from 1:1 to 30:1, preferably from 5:1 to 25:1. If the amount of the binder is less than the lower limit of the above range, the mechanical strength of the resulting ink-receiving layer is insufficient, which forms the cause of cracking and dusting. If the amount is greater than the upper limit of the above range, the pore volume of the resulting ink-receiving layer is reduced, resulting in a recording medium poor in ink absorptiveness.

The acid-processed or alkali-processed gelatin useful in the practice of the present invention may be hardened with a hardening agent. The hardening of the gelatin permits the enhancement of water fastness of the resulting ink-receiving layer.

As specific examples of the hardening agent, may be mentioned aldehyde compounds such as formaldehyde, glyoxal and glutaraldehyde; ketone compounds such as diacetyl and cyclopentanedione; active halogen compounds such as bis(2-chloroethylurea)-2-hydroxy-4,6-dichloro-1,3,5-triazine and 2,4-dichloro-6-s-triazine.sodium salt; active vinyl compounds such as divinylsulfonic acid, 1,3-vinylsulfonyl-2-propanol, N,N'-ethylenebis(vinylsulfonylacetamide) and 1,3,5-triacryloyl-hexahydro-s-triazine; N-methylol compounds such as dimethylol urea and methylol dimethyl hydantoin; isocyanate compounds such as 1,6-hexamethylenediisocyanate; aziridine compounds described in U.S. Pat. Nos. 3,017,280 and 2,983,611; carboxyimide compounds described in U.S. Pat. No. 3,100,704; epoxy compounds such as glycerol triglycidyl ether; ethyleneimino compounds such as 1,6-hexamethylene-N,N'-bisethylene urea; halogenocarboxyaldehyde compounds such as mucochloric acid and mucophenoxychloric acid; dioxane compounds such as 2,3-dihydroxydioxane; and inorganic hardening agents such as chromium alum, potassium alum, zirconium sulfate and chromium acetate. These compounds may be used either singly or in any combination thereof.

The amount of the hardening agent to be used is suitably determined in view of the balance between the water fastness of the resulting ink-receiving layer and the swell characteristics of the acid-processed or alkali-processed gelatin. However, since the alumina hydrate used in the present invention or an aluminum ion (though not clarified) dissolved out of the alumina hydrate has a tendency to exhibit an effect of hardening the acid-processed gelatin or alkali processed gelatin, the hardening agent is not necessarily used. If it is used, its amount may be smaller than the amount generally used, and is within a range of from 0.2 to 20 parts by weight, preferably from 0.5 to 15 parts by weight, more preferably from 0.7 to 10 parts by weight based on the amount of the acid-processed or alkali-processed gelatin used.

The alumina hydrate useful in the practice of the present invention may preferably be non-crystalline as analyzed by the X-ray diffraction method.

The alumina hydrate is defined by the following general formula:

$$Al_2O_{3-n}(OH)_{2n}.mH_2O$$

wherein n is an integer of 0, 1, 2 or 3, m is a number of 0 to 10, preferably 0 to 5. In many cases, $mH_2O$ represents an aqueous phase which does not participate in the formation of a crystal lattice, but is able to eliminate. Therefore, m may take a value other than an integer. Besides, m may take a value of 0 when a material of this kind is calcinated.

As the alumina hydrate used in the present invention, may also be used those containing a metal oxide, for example, titanium dioxide. The use of such alumina hydrate permits a further improvement in both properties of dispersibility and adsorptiveness of a dye in an ink, which have heretofore been difficult to achieve, compared with the conventional alumina hydrate.

The content of titanium dioxide is preferably within a range of from 0.01 to 1.00% by weight, more preferably from 0.13 to 1.00% by weight based on the alumina hydrate. Further, the valence of titanium in the titanium dioxide is preferably +4.

According to a finding of the present inventors, the titanium dioxide contained exists on the surface of the alumina hydrate in the form of such ultrafine particles that they cannot be observed through an FE-TEM (HF 2000, manufactured by Hitachi Ltd.) of 500,000 magnifications, and serves as an adsorption site upon the adsorption of the dye in the ink. The reason of that is not clearly understood. As reported by Yang, et al. [React. Kinet. Catal. Lett., 46(1), 179–186 (1992)], it is however inferred that twisted sites containing strongly electron-acceptable $Al^{3+}$ are formed by the addition of titanium dioxide, and the adsorbing ability is hence improved, or the titanium ion of titanium dioxide forms a coordinate bond with the dye. According to another finding of the present inventors, since the valence of titanium in the titanium dioxide is +4, there is no interaction between the titanium dioxide and the aluminum hydrate. As a result, the titanium dioxide exists without affecting the surface charge of the alumina hydrate under the conditions of both particle size and valence, so that the dispersibility of the alumina hydrate is not impaired. If the content of the titanium dioxide is lower than the lower limit of the above range, the improvement in the adsorptiveness of a dye in an ink is not markedly achieved. If the content is higher than the upper limit of the above range, the surface charge of the alumina hydrate is reduced, so that there is a tendency to lower the dispersibility.

If the valence of titanium in the titanium dioxide becomes lower than +4, the titanium dioxide comes to serve as a catalyst by light irradiation and the binder is hence deteriorated, so that cracking and dusting tends to occur. The alumina hydrate may contain the titanium dioxide either only in the vicinity of the surfaces of the alumina hydrate particles or up to the interiors thereof. Its content may be changed from the surface to the interior. The titanium dioxide may preferably be contained only in the close vicinity of the surface of the alumina hydrate because the bulk properties of the interior of the alumina hydrate are easy to be kept in the vicinity of the surface, thereby undergoing no change in dispersibility.

Although oxides of magnesium, calcium, strontium, barium, zinc, boron, silicon, germanium, tin, lead, zirconium, indium, phosphorus, vanadium, niobium, tantalum, chromium, molybdenum, tungsten, manganese, iron, cobalt, nickel, ruthenium and the like may be used instead of the titanium dioxide, the titanium dioxide is most preferred from the viewpoint of adsorptiveness of a dye in an ink and dispersibility. Most of the oxides of the above-mentioned metals are colored, while the titanium dioxide is colorless. Even from this point, the titanium dioxide is preferred.

The titanium dioxide-containing alumina hydrate may preferably be also of a non-crystalline structure as analyzed by the X-ray diffraction method. The alumina hydrate according to the present invention contains titanium dioxide while keeping this non-crystalline structure.

The alumina hydrate can be produced by any conventional method such as the hydrolysis of aluminum alkoxide or sodium aluminate. Rocek, et al. [Collect Czech. Chem. Commun., Vol. 56, 1253–1262 (1991)] have reported that the pore structure of aluminum hydroxide is affected by deposition temperature, pH of the solution, aging time and a kind of surfactants used.

As a process for producing the titanium dioxide-containing alumina hydrate, a process in which a liquid mixture of an aluminum alkoxide and a titanium alkoxide is hydrolyzed is most preferred because the particle size of titanium dioxide can be made small and is easy to control. The particle size and shape in this process are discussed in the form of an $Ni/Al_2O_3$ catalyst by an alkoxide process in, for example, Gakkai Shuppan Center, "Science of Surfaces", edited by Kenji Tamaru, p. 327 (1985). As another process, its production may also be conducted by adding an alumina hydrate as a nucleus for crystal growth upon the hydrolysis of the mixture of the aluminum alkoxide and the titanium alkoxide. According to this process, the titanium dioxide exists only in the vicinity of the surface of the alumina hydrate.

The shape of the alumina hydrate (hereinafter also including the titanium dioxide-containing alumina hydrate) used in the present invention is preferably in the form of a needle having an aspect ratio of not higher than 3 and unidirectionally orientates so as to aggregate like a bundle, or in the form of a flat plate having an average aspect ratio of 3 to 10 and a slenderness ratio of a flat plate surface of 0.6 to 1.0. The alumina hydrate in the form of a flat plate is particularly preferred.

The definition of the aspect ratio can be given by the method described in Japanese Patent Publication No. 5-16015. The aspect ratio is expressed by a ratio of "diameter" to "thickness" of a particle. The term "diameter" as used herein means a diameter of a circle having an area equal to a projected area of the particle, which has been obtained by observing the alumina hydrate through a microscope or an electron microscope. The slenderness ratio means a ratio of a minimum diameter to a maximum diameter of the flat plate surface when observed in the same manner as in the aspect ratio. If the average aspect ratio of the alumina hydrate in the flat plate form is lower than the lower limit of the above range, the range of the pore radius distribution of the resulting ink-receiving layer narrows. On the other hand, average aspect ratios higher than the upper limit of the above range makes it difficult to produce the alumina hydrate with its particle size even. If the average slenderness ratio is lower than the lower limit of the above range, the range of the pore radius distribution similarly narrows.

As described in the literature [Rocek J., et al., Applied Catalysis, Vol. 74, 29–36 (1991)], it is generally known that pseudoboehmite among alumina hydrates has both needle form (the ciliary form) and another form.

According to a finding of the present inventors, since particles of the alumina hydrate in the needle form (the ciliary form or the bundle form) are orientated and compacted, spaces among the alumina hydrate particles in the ink-receiving layer tend to narrow. Therefore, the pore radius is partial to a narrow side, and distribution of pore radius has a tendency to narrow. As a result, beading tends to occur. On the other hand, the alumina hydrate in the flat plate form has better dispersibility than that of a needle form (the ciliary form or the bundle form), and the orientation of particles of the alumina hydrate becomes random when forming an ink-receiving layer, so that the range of the pore radius distribution widens. Such an alumina hydrate is hence more preferred.

Incidentally, the shape, aspect ratio, slenderness ratio and particle size of alumina hydrate were determined in the following manner. An alumina hydrate sample was dispersed in deionized water, and the resultant dispersion was dropped on a collodion membrane to prepare a sample for measurement. This sample was observed through a transmission electron microscope (H-500, manufactured by Hitachi Ltd.).

The BET specific surface area of the alumina hydrate, and the pore radius distributions, pore volumes and isothermal adsorption and desorption curves of the alumina hydrate and the resulting ink-receiving layer can be determined at the same time by the nitrogen adsorption and desorption method. More specifically, an alumina hydrate sample or a recording medium sample in which an ink-receiving layer had been formed on a PET film was thoroughly heated and deaerated, and measurement was then conducted by means of Autosorb 1 manufactured by Quanthachrome Co. The BET specific surface area was calculated in accordance with the method of Brunauer, et al. [J. Am. Chem. Soc., Vol. 60, 309 (1938)]. The pore radius and pore volume were calculated in accordance with the method of Barrett, et al. [J. Am. Chem. Soc., Vol. 73, 373 (1951)].

The BET specific surface areas of the alumina hydrate may preferably be within a range of from 70 to 300 $m^2/g$. If the BET specific surface area is greater than the upper limit of the above range, the pore radius distribution is partial to a large side. As a result, a dye in an ink cannot be fully adsorbed and fixed. On the other hand, specific surface areas smaller than the lower limit of the above range result in failures to apply the pigment with good dispersibility and hence to control the pore radius distribution.

An ink-receiving layer is formed using the above-described alumina hydrate and binder. The values of physical properties of the ink-receiving layer are not determined only by the alumina hydrate used, but changed by various production conditions such as the kind and mixing amount of the binder, the concentration, viscosity and dispersion state of the coating dispersion, coating equipment, coating head, coating weight, and the flow rate, temperature and blowing direction of drying air. It is therefore necessary to control the production conditions within the optimum limits for achieving the properties of the ink-receiving layer according to the present invention.

In the first preferred embodiment of the present invention, the average pore radius of the ink-receiving layer is preferably within a range of from 20 to 200 Å, while its half breadth of pore radius distribution is preferably within a range of from 20 to 150 Å, more preferably from 80 to 150 Å. The term "half breadth of pore radius distribution" as used herein means a breadth of pore radius which is a magnitude half of the magnitude of the average pore radius. If the average pore radius is larger than the upper limit of the above range, the resulting recording medium is deteriorated in the adsorption and fixing of a dye in an ink, and so bleeding tends to occur on images. If the average pore radius is smaller than the lower limit of the above range, the resulting recording medium is deteriorated in ink absorptiveness, and so beading tends to occur. On the other hand, if the half breadth is outside the above range, the resulting recording medium is deteriorated in the adsorption of a dye or a solvent in an ink.

As with the ink-receiving layer, the pore radius distribution of the alumina hydrate preferably has an average pore radius of 20 to 200 Å and a half breadth of pore radius distribution of 20 to 150 Å. The pore radius distribution of the ink-receiving layer depends upon the pore radius distribution of the alumina hydrate. Therefore, if the pore radius distribution of the alumina hydrate is outside the above range, the pore radius distribution of the ink-receiving layer cannot be controlled within the above range.

The pore volume of the ink-receiving layer is preferably within a range of from 0.4 to 0.6 cc/g. If the pore volume of the ink-receiving layer is greater than the upper limit of the above range, cracking and dusting occur on the ink-receiving layer. If the pore volume is smaller than the lower limit of the above range, the resulting recording medium is deteriorated in ink absorption. Further, the pore volume of the ink-receiving layer is more preferably at least 8 $cc/m^2$. If the pore volume is smaller than this limit, inks tend to run out of the ink-receiving layer, in particular, when multi-color printing is conducted, and so bleeding occurs on images.

As with the ink-receiving layer, the pore volume of the alumina hydrate is preferably within a range of from 0.4 to 0.6 cc/g. If the pore volume of the alumina hydrate is outside the above range, the pore volume of the ink-receiving layer cannot be controlled within the above range.

In the second preferred embodiment of the present invention, the ink-receiving layer has at least two peaks in the pore radius distribution. The solvent component in an ink is absorbed by relatively large pores, while the dye in the ink is adsorbed by relatively small pores. The pore radius corresponding to one of the peaks is preferably smaller than 100 Å, more preferably 10 to 60 Å. The pore radius corresponding to another peak is preferably within a range of from 100 to 200 Å. If the pore radius corresponding to the former peak is larger than the above limit, the resulting recording medium is deteriorated in the adsorption and fixing of the dye in the ink, and so bleeding and beading occur on images. The beading mentioned as used herein refers to a phenomenon in which droplets of inks applied to the surface of an ink-receiving layer aggregate in the form of beads due to poor ink absorptiveness of the ink-receiving layer, and so adjacent ink droplets of different colors are mixed to form an image having color irregularity.

If the pore radius corresponding to the latter peak is smaller than the lower limit of the above range, the resulting recording medium is deteriorated in the absorption of the solvent component in the ink, so that the ink is not well dried, and the surface of the ink-receiving layer remains wet even when the medium is discharged out of a printer after printing. If the pore radius corresponding to the latter peak is greater than the upper limit of the above range, the resulting ink-receiving layer tends to crack.

As with the ink-receiving layer, in the pore radius distribution of the alumina hydrate, the pore radius corresponding to one of the peaks is preferably smaller than 100 Å, more preferably 10 to 60 Å. The pore radius corresponding to another peak is preferably within a range of from 100 to 200 Å. The pore radius distribution of the ink-receiving layer depends upon the pore radius distribution of the alumina hydrate. Therefore, if the pore radius distribution of the alumina hydrate is outside the above range, the pore radius distribution of the ink-receiving layer cannot be controlled within the above range.

The total pore volume of the ink-receiving layer is preferably within a range of from 0.1 to 1.0 cc/g, more preferably from 0.4 to 1.0 cc/g, most preferably from 0.4 to 0.6 cc/g. If the pore volume of the ink-receiving layer is greater than the upper limit of the above range, cracking and dusting occur on the ink-receiving layer. If the pore volume is smaller than the lower limit of the above range, the resulting recording medium is deteriorated in ink absorption.

Further, the pore volume of the ink-receiving layer is more preferably at least 8 $cc/m^2$. If the pore volume is smaller than this limit, there is a potential problem that inks may tend to run out of the ink-receiving layer, in particular, when multi-color printing is conducted, and so bleeding occurs on images. The pore volume of pores having a peak at a pore radius of smaller than 100 Å means a pore volume within a range showing a breadth of pore radii having a magnitude half of the greatest-magnitude pore radius of the pores having a peak at smaller than 100 Å in the pore radius distribution. This pore volume of the pores having the peak at a pore radius of smaller than 100 Å is preferably within a range of from 0.1 to 10% by volume, more preferably from 1 to 5% by volume based on the total pore volume.

As with the ink-receiving layer, the pore volume of the alumina hydrate is preferably within a range of from 0.1 to 1.0 cc/g, more preferably from 0.4 to 1.0 cc/g.

Further, the pore volume of pores having a peak at a pore radius of smaller than 100 Å is preferably within a range of from 0.1 to 10% by volume, more preferably from 1 to 5% by volume based on the total pore volume. The pore volume of the ink-receiving layer depends upon the pore volume of the alumina hydrate. Therefore, if the pore volume of the alumina hydrate is outside the above range, the pore volume of the ink-receiving layer cannot be controlled within the above range.

The alumina hydrates according to the first and second embodiments may be used in combination with each other.

An isothermal nitrogen adsorption and desorption curve can be obtained similarly by the nitrogen adsorption and desorption method. A relative pressure difference (ΔP) between adsorption and desorption at 90 percent of the maximum amount of adsorbed gas as found from an isothermal nitrogen adsorption and desorption curve for the ink-receiving layer is preferably not larger than 0.2, more preferably not larger than 0.15, most preferably not larger than 0.10. As described in McBain [J. Am. Chem. Soc., Vol. 57, 699 (1935)], the relative pressure difference (ΔP) can be used as an index whether a pore in the form of an inkpot may exist. The pore is closer to a straight tube as the relative pressure difference (ΔP) is smaller. On the other hand, the pore is closer to an inkpot as the difference is greater. Differences exceeding the above limit result in a recording medium poor in dryness of an ink after printing.

A relative pressure difference (ΔP) between adsorption and desorption at 90 percent of the maximum amount of adsorbed gas as found from an isothermal nitrogen adsorption and desorption curve for each of the alumina hydrates is preferably not larger than 0.2, more preferably not larger than 0.15, most preferably not larger than 0.10. If the difference is outside this limit, it is difficult to control the relative pressure difference (ΔP) of the ink-receiving layer as found from the isothermal nitrogen adsorption and desorption curve within the above limit.

The number of hydroxyl groups on the surface of each of the alumina hydrates can be determined by titration with a triethylaluminum solution. In this invention, 1 g of an alumina hydrate sample was weighed out to conduct the titration. The number of the hydroxyl groups is preferably at least $10^{20}$ groups/g. If the number is fewer than this value, the solids concentration of a dispersion in which the alumina hydrate is dispersed in water cannot be increased.

The surface potential of each of the alumina hydrates can be determined by a zeta potential analyzer. In the present invention, the zeta-potential was determined by dispersing an alumina hydrate sample in deionized water to give a solids concentration of 0.1% by weight, and then adjusting the dispersion to pH 6, thereby conducting measurement (Bi-ZETA plus, manufactured by Brookheaven Co.). The zeta-potential of the dispersion at pH 6 is preferably at least 15 mV. If the zeta-potential is above this limit, an acid must be added to improve the dispersibility of the alumina hydrate. However, the addition of the acid may cause emission of offensive odor and occurrence of corrosion.

The viscosity of a dispersion can be determined by means of any common viscometer. A dispersion obtained by dispersing each of the above-described alumina hydrates in deionized water to give a solids concentration of 15% by weight, and containing a nitrate anion in an amount of 0.1 to 1.0% by weight based on the alumina hydrate preferably has a viscosity of not higher than 75 cP, most preferably not higher than 30 cP as measured at 20° C. and a shear rate of 7.9 $sec^{-1}$. If the viscosity exceeds the upper limit, the dispersion is required to low its solids concentration, or to add an acid so as to improve the dispersibility. In this invention, a nitrate anion was extracted from an alumina hydrate sample with hot water to measure its quantity by an ion-exchange chromatograph (L-3720, manufactured by Hitachi Ltd.), thereby determining the quantity of the nitrate anion in terms of % by weight of dried alumina hydrate. The viscosity of the dispersion can be determined by means of any common viscometer, but was measured by means of a VISCOMETER manufactured by TOKIMEC CO. in the present invention.

Particularly preferable combinations of the above-described alumina hydrates and acid-processed gelatins, which have the specific physical properties, are as follows:

| | |
|---|---|
| A) Alumina hydrate: | |
| Average particle size | 35 to 50 nm |
| BET specific surface area | 70 to 120 $m^2/g$ |
| Average pore radius | 60 to 140 Å |
| Pore volume | 0.54 to 0.58 cc/g |
| pH | 4.5 to 7.5 |
| (measured in the form of a 15% dispersion at 27° C.) | |
| Acid-processed gelatin: | |
| Weight average molecular weight | 20,000 to 160,000 |

-continued

| | |
|---|---|
| Number average molecular weight | 15,000 to 75,000 |
| MW/Mn | 1.0 to 3.5 |
| B) Alumina hydrate: | |
| Average particle size | 20 to 34 nm |
| BET specific surface area | 120 to 250 $m^2/g$ |
| Average pore radius | 20 to 60 Å |
| Pore volume | 0.50 to 0.55 cc/g |
| pH | 2.0 to 4.5 |
| (measured in the form of a 15% dispersion at 27° C.) | |
| Acid-processed gelatin: | |
| Weight average molecular weight | 20,000 to 75,000 |
| preferably | 20,000 to 45,000 |
| Number average molecular weight | 15,000 to 40,000, |
| preferably | 15,000 to 30,000 |
| Mw/Mn | 1.0 to 2.1 |
| preferably | 1.0 to 1.7 |
| C) Alumina hydrate: | |
| Average particle size | 35 to 50 nm |
| BET specific surface area | 70 to 120 $m^2/g$ |
| Average pore radius | 60 to 140 Å |
| Pore volume | 0.54 to 0.58 cc/g |
| pH | 2.0 to 4.5 |
| (measured in the form of a 15% dispersion at 27° C.) | |
| Acid-processed gelatin: | |
| weight average molecular weight | 20,000 to 75,000 |
| Number average molecular weight | 15,000 to 40,000 |
| Mw/Mn | 1.0 to 2.1 |

Particularly preferable combinations of the above-described alumina hydrates and alkali-processed gelatins, which have the specific physical properties, are as follows:

| | |
|---|---|
| A) Alumina hydrate: | |
| Average particle size | 35 to 50 nm |
| BET specific surface area | 70 to 120 $m^2/g$ |
| Average pore radius | 60 to 140 Å |
| Pore volume | 0.54 to 0.58 cc/g |
| pH | 4.5 to 7.5 |
| (measured in the form of a 15% dispersion at 27° C.) | |
| Alkali-processed gelatin: | |
| Weight average molecular weight | 8,000 to 75,000 |
| Number average molecular weight | 10,000 to 40,000 |
| Mw/Mn | 0.5 to 2.0 |
| B) Alumina hydrate: | |
| Average particle size | 20 to 34 nm |
| BET specific surface area | 120 to 250 $m^2/g$ |
| Average pore radius | 20 to 60 Å |
| Pore volume | 0.50 to 0.55 cc/g |
| pH | 2.0 to 4.5 |
| (measured in the form of a 15% dispersion at 27° C.) | |
| Alkali-processed gelatin: | |
| Weight average molecular weight | 8,000 to 45,000 |
| preferably | 8,000 to 20,000 |
| Number average molecular weight | 8,000 to 30,000, |
| preferably | 8,000 to 20,000 |
| Mw/Mn | 0.5 to 1.8 |
| preferably | 0.6 to 1.5 |
| C) Alumina hydrate: | |
| Average particle size | 35 to 50 nm |
| BET specific surface area | 70 to 120 $m^2/g$ |
| Average pore radius | 60 to 140 Å |
| Pore volume | 0.54 to 0.58 cc/g |
| pH | 2.0 to 4.5 |
| (measured in the form of a 15% dispersion at 27° C.) | |
| Alkali-processed gelatin: | |
| Weight average molecular weight | 8,000 to 80,000 |
| preferably | 8,000 to 20,000 |
| Number average molecular weight | 8,000 to 45,000, |
| preferably | 8,000 to 20,000 |
| Mw/Mn | 0.5 to 1.8 |
| preferably | 0.6 to 1.5 |

The ink-receiving layer is formed by applying a dispersion comprising the alumina hydrate and the binder such as gelatin onto a base material by means of a coater and then drying the base material.

As a coating process, may be used a blade coating system, air-knife coating system, roll coating system, brush coating system, gravure coating system, kiss coating system, extrusion system, slide hopper (slide bead) system, curtain coating system, spray coating system, or the like. However, the kiss coating system, extrusion system, slide hopper system and curtain coating system, which are used as coating systems for photographic materials, are preferred in that a thick ink-receiving layer is formed by making good use of the sol-gel conversion (setting ability) of the gelatin. The extrusion system and slide hopper system are particularly preferred in that the thick coat is provided stably and evenly.

More specifically, in the case of the slide hopper system by way of example, as described in U.S. Pat. Nos. 2,761,791, 4,001,024 and 5,188,931, and "Glue and Gelatin" (published by Japan Glue & Gelatine Manufacturers' Association, Maruzen, 1987), a dispersion charged in a slide hopper type caster through a feed pump is run in a laminar form on a sliding surface to get on a base material. Cold air is then blown against the dispersion there to gel it into a jelly form. The thus-gelled dispersion is introduced into a drying zone as it is to dry it, thereby forming an ink-receiving layer. Thereafter, the layer is aged to harden the gelatin as needed. The surface smoothness of the ink-receiving layer may also be improved by means of calender rolls or the like as needed.

The coating weight of the dispersion is within a range of from 0.5 to 60 $g/m^2$, more preferably from 5 to 45 $g/m^2$ in terms of dry solids contents. In order to provide good ink absorptiveness and resolution, it is necessary to control the thickness of the ink-receiving layer to at least 15 μm, preferably at least 20 μm, particularly at least 25 μm.

The dispersion used in the above coating exhibits thixotropic property though its reason is not clarified. In the present invention, a TI value was used to express the degree of the thixotropic property. The TI value denotes a "Thixotropic Index" that is a quotient obtained by measuring the viscosity of the dispersion at varied revolutions by means of a rotational viscometer such as a Brookfield type viscometer and dividing a value at the lower revolution by a value at the higher revolution. In the present invention, the TI value was calculated with viscosities at 6 rpm/60 rpm. If this value is greater than 1, such a liquid forms a structure and exhibits thixotropic property. In the dispersion according to the present invention, the TI value varies depending upon a solids concentration, dispersion conditions and the like, but is preferably within a range of from 1.1 to 5.0, more preferably from 1.3 to 4.5, most preferably from 1.6 to 4.1. The dispersion may preferably be adjusted to such a TI range.

The dispersion according to the present invention exhibits thixotropic property and its viscosity hence reduces when great force is applied thereto. Therefore, when a coating is conducted by, for example, a slide hopper (slide bead) system, the dispersion is low in viscosity and easy to flow while it runs in the laminar form out of a slide hopper. However, when it gets on a base material, it becomes a fixed state (a state applied with no force). Therefore, its viscosity increases and hence becomes hard to level and to sag. Accordingly, the sagging of the dispersion is suppressed by both the setting ability of the acid-processed or alkali-processed gelatin and this thixotropic property, and so a thick ink-receiving layer is easy to be formed.

If the TI value is below the lower limit of the above range, the dispersion applied to the base material sags because it has low or no thixotropic property. If the TI value is above the upper limit of the above range, a dispersing machine which requires great power is required to reduce the viscosity of the dispersion, resulting in an enlarged apparatus. If the power of the dispersing machine is insufficient, the viscosity cannot be reduced, resulting in difficulty in applying the dispersion.

By the use of the specific gelatin as described above, the dispersion comprising the alumina hydrate and the gelatin turns to gel from sol by influence of the gelatin when cooled with cold air. Besides, the thixotropic property of the dispersion also properly acts, whereby the dispersion ceases to sag in spite of its wet state. It is hence possible to form a thick ink-receiving layer.

Since the dispersion has thixotropic property, even low-molecular-weight gelatin which is low in setting ability for photographic gelatin and hence not routinely used by itself can be satisfactorily used so far as its weight average molecular weight, number average molecular weight and jelly strength fall within the above ranges.

In the present invention, the setting ability of gel was determined by measuring the viscosity of the dispersion while lowering its temperature, and evaluated. In the present invention, the temperature of the dispersion was lowered at a rate of 1° C./min from 50° C. to measure its viscosity at 30° C. and 20° C. or 15° C., thereby determining a ratio of both viscosities. The ratio of the viscosity at 20° C. to the viscosity at 30° C. is preferably within a range of from 1 to 300. On the other hand, the ratio of the viscosity at 15° C. to the viscosity at 30° C. is preferably within a range of from 2 to 1000. Further, the ratio of the viscosity at 15° C. to the viscosity at 20° C. is preferably within a range of from 1.5 to 10, preferably from 2 to 9. If the respective ratios are lower than the lower limits of the above ranges, the dispersion is insufficient in gelation (setting ability), and hence undergoes leveling and is easy to sag. Greater viscosity ratios make the setting ability of gel better because the viscosity of the dispersion rapidly increases. However, if the ratios exceed the upper limits of the above ranges, the viscosity of the dispersion sharply varies according to the temperature, so that the thickness of the coat becomes liable to vary, resulting in difficulty in conducting stable coating.

It is known that the viscosity of a gelatin dispersion sharply increases (setting ability) at a temperature lower than a certain temperature (setting temperature). However, the mixed dispersion of the alumina hydrate and the acid-processed or alkali-processed gelatin according to the present invention is lower in viscosity increase than the dispersion of gelatin alone. It is considered that the dispersion of the alumina hydrate and the acid-processed or alkali-processed gelatin according to the present invention differs in mechanism of setting from the gelatin dispersion conventionally used together with silver salts in that the dispersion of this invention is low in gelatin concentration compared with the conventionally used gelatin dispersion and contains the alumina hydrate in an overwhelmingly more amount than the gelatin and that a gelatin low in molecular weight, which has heretofore not been used, is used.

The content of the gelatin in the dispersion is preferably within a range of from 0.7 to 50%, more preferably from 0.9 to 40%, most preferably from 1 to 30% in terms of solids concentration. If the solids concentration of gelatin at a usual cooling temperature (4° to 20° C.) upon the coating is lower than the lower limit of the above range, the gelation (setting ability) of the gelatin becomes insufficient, and so the dispersion undergoes leveling and sags. In addition, the thixotropic property of the dispersion becomes low, which makes the formation of a good, thick ink-receiving layer difficult. If the solids concentration exceeds the upper limit of the above range on the other hand, the viscosity of the dispersion becomes too high to apply the dispersion.

In the present invention, an alkaline earth metal is contained in the dispersion in addition to the alumina hydrate and the acid-processed gelatin, whereby the dispersion is provided with a low viscosity even if the solids concentration of the dispersion is increased. In addition, a recording medium prepared by using such a dispersion has high surface gloss.

Alkaline earth metals used in the present invention include ions of calcium, magnesium, strontium and barium. These ions are added in the form of a halide, hydroxide, nitrate, acetate, sulfate, thiosulfate, phosphate, hydrogenphosphate or dihydrogenphosphate.

Of these, calcium chloride, calcium nitrate, calcium acetate, magnesium chloride, magnesium nitrate and magnesium acetate are particularly preferred because they are high in solubility in water and hence excellent in stability to change with time in the dispersion. In particular, calcium chloride, calcium nitrate, magnesium chloride and magnesium nitrate are very preferred because they do not emit offensive odor.

Figure 2:
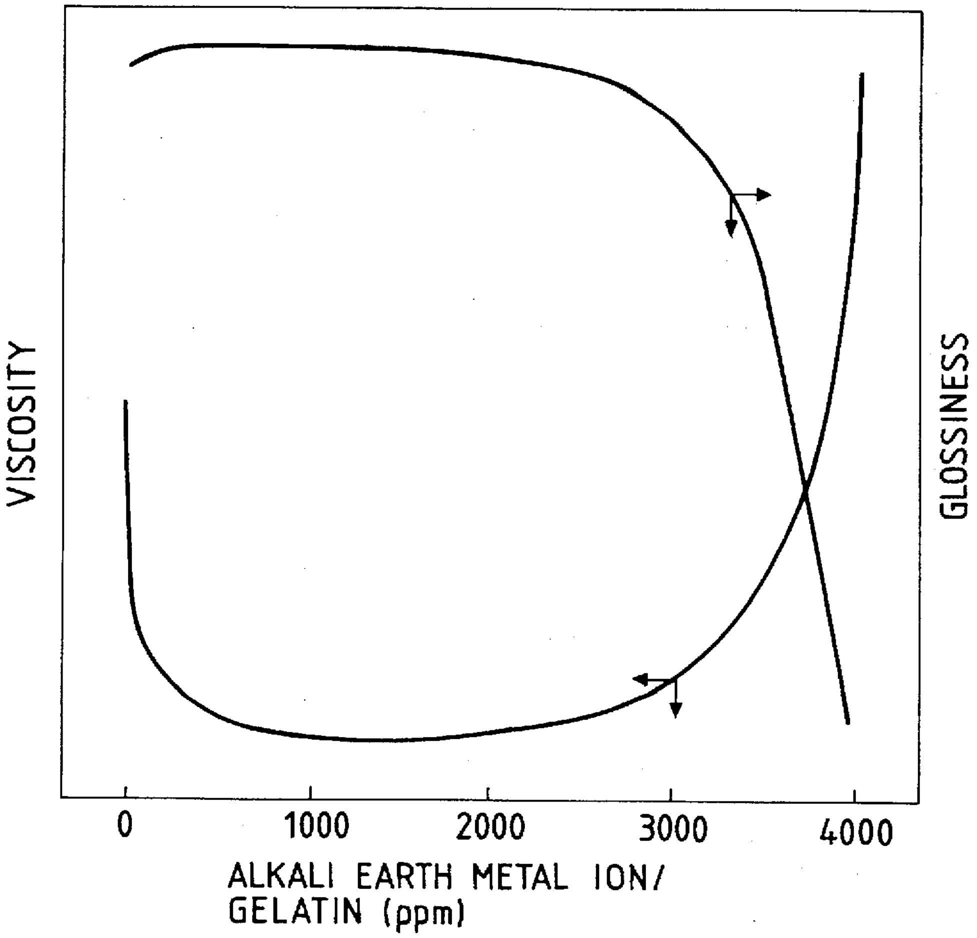
FIG. 2 diagrammatically illustrates changes in viscosity and glossiness according to the amount of an alkaline earth metal ion.

An investigation as to the amount (concentration) of the alkaline earth metal ion to be added by the present inventors has revealed that there is a relationship as illustrated in FIG. 2 among the concentration of the alkaline earth metal ion, the viscosity of the dispersion and the surface gloss of the coat. Taking account of the viscosity of the dispersion, which is suitable for the production of the recording medium, and the surface gloss suitable for the provision of an image giving a feeling of high grade from this result, the amount of the alkaline earth metal ion to be added is preferably within a range of from 100 to 3,000 ppm based on the gelatin. An amount within a range of from 500 to 2,000 ppm is particularly preferred because the viscosity of the dispersion becomes lowest, and variations of the viscosity and surface gloss according to the change of the added amount are small.

Amounts of the alkaline earth metal ion less than 100 ppm are too little to exhibit its effects. On the contrary, if the amount exceeds 3,000 ppm, the surface gloss of the resulting ink-receiving layer becomes low, and the diffusion electric double layer of particles becomes too thin, and so the particles tend to aggregate, and the dispersion is hence liable to increase its viscosity.

As a process for adding the alkaline earth metal, may be mentioned a process in which it is added during production of the gelatin, or upon swelling of the gelatin, dispersion of the alumina hydrate or mixing of the alumina hydrate and the gelatin.

The dispersion comprising principally the alumina hydrate and the acid-processed or alkali-processed gelatin may optionally contain dispersants for the alumina hydrate, viscosity modifiers, pH adjustors, lubricants, flowability modifiers, surfactants, antifoaming agents, water-proofings, foam suppressors, releasing agents, foaming agents, penetrants, coloring dyes, optical whitening agents, ultraviolet absorbents, antioxidants, antiseptics and mildew-proofing agents.

The water-proofings may be freely selected for use from the known substances such as quaternary ammonium halides and quaternary ammonium salt polymers.

As the base material, may be used paper webs such as suitably sized paper, water leaf paper and resin-coated paper, sheet-like substance such as thermoplastic films, and cloths. No particular limitation is imposed on the base material.

In the case of the thermoplastic films, may be used transparent films such as films of polyester, polystyrene, polyvinyl chloride, polymethyl methacrylate, cellulose acetate, polyethylene and polycarbonate, as well as opaque sheets opacified by the filling of an alumina hydrate or the formation of minute foams.

When the resin-coated paper is used as the base material, the recording medium according to the present invention can be provided as a recording medium having the same feeling to the touch, stiffness and texture as those of a usual photoprint. Further, the recording medium according to the present invention becomes very close to the usual photoprint because its ink-receiving layer has high surface gloss.

The base material may be subjected to a surface treatment such as a corona discharge treatment for improving its adhesiveness to the ink-receiving layer, or provided with an easy-adhesion layer as an under coat. Further, a curl-preventing layer such as a resin layer or a pigment layer may be provided on the back surface of the base material or at a desired position thereof to prevent curling.

Inks used in the recording method according to the present invention comprises principally a coloring material (dye or pigment), a water-soluble organic solvent and water. Preferred examples of the dye include water-soluble dyes represented by direct dyes, acid dyes, basic dyes, reactive dyes and food colors. However, any dyes may be used so far as they provide images satisfying required performance such as fixing ability, coloring ability, brightness, stability, light fastness and the like in combination with the above-described recording media.

The water-soluble dyes are generally used by dissolving them in water or a solvent composed of water and at least one organic solvent. As a preferable solvent component for these dyes, may be used a mixed solvent composed of water and at least one of various water-soluble organic solvents. It is however preferable to control the content of water in an ink within a range of from 20 to 90% by weight, more preferably from 60 to 90% by weight.

Examples of the water-soluble organic solvents include alkyl alcohols having 1 to 4 carbon atoms, such as methyl alcohol, ethyl alcohol, n-propyl alcohol, isopropyl alcohol, n-butyl alcohol, sec-butyl alcohol, tert-butyl alcohol and isobutyl alcohol; amides such as dimethylformamide and dimethylacetamide; ketones and keto alcohols such as acetone and diacetone alcohol; ethers such as tetrahydrofuran and dioxane; polyalkylene glycols such as polyethylene glycol and polypropylene glycol; alkylene glycols the alkylene moiety of which has 2 to 6 carbon atoms, such as ethylene glycol, propylene glycol, hexylene glycol and diethylene glycol; thiodiglycol; 1,2,6-hexanetriol; glycerol; lower alkyl ethers of polyhydric alcohols, such as ethylene glycol methyl ether, diethylene glycol methyl ether, diethylene glycol ethyl ether, triethylene glycol monomethyl ether and triethylene glycol monoethyl ether; and the like.

Among these many water-soluble organic solvents, the polyhydric alcohols such as ethylene glycol and diethylene glycol, and the lower alkyl ethers of polyhydric alcohol, such as triethylene glycol monomethyl ether and triethylene glycol monoethyl ether are preferred. The polyhydric alcohols are particularly preferred because they have an effect as a lubricant for preventing the clogging of nozzles, which is caused by the evaporation of water in an ink and hence the deposition of a water-soluble dye contained therein.

A solubilizer may be added to the inks. Nitrogen-containing heterocyclic ketones are typical solubilizers. Its object is to enhance the solubility of the water-soluble dye in the solvent by leaps and bounds. For example, N-methyl-2-pyrrolidone, 1,3-dimethyl-2-imidazolidinone are preferably used. In order to further improve the properties of inks, may be added additives such as viscosity modifiers, surfactants, surface tension modifiers, pH adjustors, specific resistance adjustors and storage stabilizers.

A preferred method of conducting recording by applying the above-described ink to the recording medium is an ink-jet recording method. As such a method, any system may be used so far as it can effectively eject an ink out of a nozzle to apply the ink to the recording medium. In particular, an ink-jet recording system described in Japanese Patent Application Laid-Open No. 54-59936, in which an ink undergoes a rapid volumetric change by an action of thermal energy applied to the ink, so that the ink is ejected out of an nozzle by the working force generated by this change of state, may be used effectively.

The ink-receiving layer comprising the alumina hydrate and the acid-processed or alkali-processed gelatin according to the present invention is preferable in that it exhibits good color reproducibility. In general, a dispersion of the alumina hydrate is added with an organic acid such as a monocarboxylic acid disclosed in Japanese Patent Application Laid-Open No. 4-67985 or an inorganic acid in an amount of generally several tens percent for keeping its good dispersion state. The dispersion may have a pH of about 2 to 5 and is high in acidity though it varies according to the amount of the acid added.

When such an alumina hydrate dispersion is mixed with an aqueous solution of a water-soluble polymer routinely used as a binder, for example, polyvinyl alcohol to form an ink-receiving layer, and printing is conducted on the ink-receiving layer with an ink according to an ink-jet system, the ink is changed by such an acid to cause a change in tint. However, when the specific gelatin according to the present invention is used as a binder, little change in tint is caused even if the acidity of the alumina hydrate dispersion is high, and a print satisfying the following relationship:

$$|\lambda 1-\lambda 2| \leqq 30 \ nm$$

wherein λ1 denotes the maximum absorption spectrum of the ink, and λ2 is the maximum absorption spectrum of an area printed with the ink on the recording medium, can be obtained by controlling the kinds of the alumina hydrate and the gelatin and the quantitative proportion thereof. In particular, changes of magenta and cyan inks in tint can be suppressed, and a print satisfying the relationship of the formula:

$$|\lambda 1-\lambda 2| \leqq 10 \ nm$$

can be obtained.

The reason why the use of the gelatin as described above makes the change in tint little is not clarified. It may however be considered that the gelatin has many carboxyl groups ($H^+$ emitting ability) and amino groups ($H^+$acceptability), and these groups serve to control the acidity in a system (ink-receiving layer). When the conventional polyvinyl alcohol is used as a binder, the acidity cannot be controlled unlike the gelatin, and so the change in tint occurs.

The ink-receiving layer comprising the alumina hydrate and the natural polymer such as gelatin or a derivative thereof, which are useful in the practice of the present invention, has high surface gloss and provides a glossy, good image because it is free from scattering at its surface. As described above, further, its print is very close to a photoprint. Its glossiness Gs (60) can be determined by the method (angle of incidence: 60 degrees) prescribed in JIS Z 8741. In the present invention, a glossiness Gs1 (60) of a non-printed area and a glossiness Gs2 (60) of an area printed with ink dots in the case where a white polyethylene terephthalate film or resin-coated paper is used as a base material are both preferably at least 40, more preferably at least 45, most preferably at least 50 though they vary according to the kinds of the alumina hydrate and the gelatin, the quantitative proportion thereof, and the mixing and dispersing method of both dispersion of the alumina hydrate and solution of the gelatin. It is preferable to adjust the kinds of the alumina hydrate and the gelatin, the quantitative proportion thereof and the mixing and dispersing method of both dispersion of the alumina hydrate and solution of the gelatin to give such values.

In the conventional recording media, there has been a problem that a glossiness of a printed area is considerably reduced compared with a glossiness of a non-printed area. In such a case, since the non-printed area and the printed area are considerably different from each other in glossiness, such an image strikes as strange when having a look at it, and so its quality becomes poor. In the present invention, however, the reduction of gloss at the printed area is little. Therefore, a feature of the present invention is that a print satisfying the relationship of $|Gs1 (60)-Gs2 (60)| \leqq 20$, preferably $|Gs1 (60)-Gs2 (60)| \leqq 15$, more preferably $|Gs1 (60)-Gs2 (60)| \leqq 10$ can be provided though the degree of the reduction in gloss varies according to the kinds of the alumina hydrate and the gelatin, the quantitative proportion thereof, and the mixing and dispersing method of both dispersion of the alumina hydrate and solution of the gelatin.

[Examples]

The present invention will hereinafter be described more specifically by the following Examples. However, the present invention is not limited to these examples.

The measurements of various properties of acid-processed gelatins (a1 to f1) and alkali-processed gelatins (a2 to h2) used in the following examples were conducted in the following manners. The results are shown in Tables 1 and 2, respectively.

1) Molecular weight distribution [weight average molecular weight (Mw), number average molecular weight (Mn)]

Two grams of gelatin were put in a 100-ml measuring flask, to which an eluting solution (a mixed solution of 0.1M potassium dihydrogenphosphate and 0.1M sodium dihydrogenphosphate; 1:1) was added, thereby swelling the gelatin fully. Thereafter, the gelatin was dissolved in the eluting solution over about 6 hours at about 40° C. The resulting solution was diluted with an eluting solution into a 1/10 solution to provide a 0.2% sample gelatin solution. The sample solution was filtered through a membrane filter having a pore size of 0.45 μm. The measurement was then conducted by a high-speed liquid chromatography. The apparatus used and measurement conditions are as follows:

| Apparatus (manufactured by TOSOH CORP.): | |
|---|---|
| Main body | HLC-8020 |
| System controller | SC-8010 |
| Spectrophotometer | UV-8 010 |
| Automatic sampler | AS-8000 |
| Degasser | SD-8000 |
| Printer | PP-8010 |

-continued

| Conditions: | |
|---|---|
| Column | GPC column composed of a vinyl alcohol copolymer (Asahipak GS-620, two in series; product of Asahi Chemical Industry Co., Ltd.) |
| Flow rate | 1.0 ml/min |
| Charged amount | 100 μl |
| Detection method | Optical density at 230 nm in a ultraviolet region. |

The calculation of the molecular weight of the sample gelatin was conducted in accordance with a method in which a calibration curve is prepared with albumin, ovalbumin, mitochrome or the like, the molecular weight of which has already been known, from its retention time and molecular weight, and the retention time of the sample gelatin solution is applied to the calibration curve to calculate the molecular weight. This method is described in "Relationship between Molecular Weight Distribution, and Viscosity and Jelly Strength of Gelatin" which was a known document published in March Meeting of NSG (Nippon Shashin Gakkai) on Mar. 9, 1984.

2) Jelly strength

The jelly strength was determined by measuring, by means of a jelly tester (manufactured by Stevens Co.), a load required to press down the surface of a 6(2/3) % aqueous solution of gelatin, which had been cooled to 10° C. in a specific jelly cup made of glass, by 4 mm with a specific plunger.

3) pH:

The pH of a 5% aqueous solution of gelatin was measured at a solution temperature of 35° C. by means of a pH meter (HM-40S, manufactured by Toa Electronics Ltd.).

4) Isoionic point

After 100 ml of hot water of 45° C. was passed through a column (while introducing hot water of about 40° C. into its jacket) in which 5 ml of a cation exchange resin (IR-120B, product of Amberlite Co.) and 10 ml of an anion exchange resin (IRA-401, product of Amberlite Co.) were mixed and evenly packed to warm the resins, 100 ml of an 1 1% aqueous solution of gelatin was passed through the column at a rate of 50 ml/hour. After about 25 ml of a initial effluent from the column was removed, 50 ml of another effluent was collected to measure its pH at a liquid temperature of 35° C. by means of a pH meter (HM-40S, manufactured by Toa Electronics Ltd.), thereby determining this value as the isoionic point.

5) Zeta-potential

A 0.1% by weight aqueous solution of gelatin was used as a sample to measure its zeta-potential by means of a zeta-potential meter (Bi-ZETA plus, manufactured by Brookheaven Co.). Incidentally, its particle diameter is also measured at the same time by this apparatus.

6) Swelling rate

The swelling rate was determined in the following manner:

(a) A hole of about 3 cm in diameter is bored in a cover of a 250-cc container made of polyethylene, and the container is covered with a #400 nylon mesh.

(b) The weight (A) of the polymeric container with the mesh is measured.

(c) In the container, 195 g of a solvent (deionized water or ethylene glycol) is weighed out.

(d) Five grams of gelatin are weighed out.

(e) The gelatin is put in the container and left over for 24 hours at room temperature.

(f) A blowhole (a rectangle of about 1 mm×about 1 cm) is bored in the container at its upper end.

(g) The container is inclined to discharge the solvent, and the weight (the container with the mesh + swelled gelatin, B) after that is measured. Here, the time to discharge the solvent is determined by timing the time the solvent has started to run out. (For example, 30 seconds for deionized water and 60 seconds for ethylene glycol).

(h) The swelling rate is calculated by the following equation:

$$\text{Swelling rate } (\%)=((B-A-5)/5)\times 100.$$

Alumina hydrates used in the following examples are the following eight kinds of alumina hydrates.

A to D

An aluminum alkoxide was prepared in accordance with the process described in U.S. Pat. No. 4,242,271. The aluminum alkoxide was then hydrolyzed in accordance with the process described in U.S. Pat. No. 4,202,870, and portions of the resulting hydrolyzate were aged under their corresponding conditions and apparatus shown in Table 3 to obtain colloidal sols of alumina. These colloidal sols were spray-dried at 75° C. to obtain alumina hydrates A to D. These alumina hydrates were non-crystalline and in the form of a flat plate. The physical property values of the resulting alumina hydrates were measured in accordance with the respective methods described above. The results are shown in Table 3.

E to H

An aluminum alkoxide was prepared in accordance with the process described in U.S. Pat. No. 4,242,271. Isopropyltitanium (product of Kishida Chemical Co., Ltd.) was then mixed in an amount 5/1000 times of the weight of the aluminum alkoxide. The resulting aluminum alkoxide mixture was hydrolyzed in accordance with the process described in U.S. Pat. No. 4,202,870, and portions of the resulting hydrolyzate were aged under their corresponding conditions and apparatus shown in Table 4 to obtain colloidal sols of titanium dioxide-containing alumina. These colloidal sols were spray-dried at 75° C. to obtain alumina hydrates E to H. These alumina hydrates were non-crystalline and in the form of a flat plate. The physical property values of the resulting alumina hydrates were measured in accordance with the respective methods described above. The results are shown in Table 4.

Examples 1 to 45

Mixed dispersions were prepared by separately weighing out their corresponding 10% by weight solutions of the gelatins (a1 to f1) in deionized water shown in Table 5 and their corresponding 15% by weight dispersions of alumina hydrates (A to H) in deionized water shown in Table 5 to give their corresponding weight ratios in terms of solids (P/B ratio=weight of solid alumina hydrate/weight of solid gelatin) shown in table 5, and mixing under stirring the respective solutions and dispersions with each other for 30 minutes at 8,000 rpm by a disperser (T. K. Homomixer M type, manufactured by Tokushu Kika Kogyo Co., Ltd.). Each of the resultant dispersions was applied by a slide hopper system to one side of a resin-coated paper web (product of Oji Paper Co., Ltd., thickness: 238 μm, basis weight: 249.8 g/m$^2$, brightness by the whole light: 91.58; RC), a white polyester film (Lumiror X-21, product of Toray Industries, Inc., thickness: 100 μm; WP) or a transparent polyester film (Lumiror T, product of Toray Industries, Inc., thickness: 100 μm; TP) to form an ink-receiving layer having a thickness of 30 μm, thereby obtaining a recording medium. The physical properties of the mixed dispersions and the resulting ink-receiving layers were measured in accordance with the respective methods described below. The results are shown in Table 5.

Evaluating and measuring methods of physical properties of dispersion

1) Dispersing state

The dispersing state was visually evaluated. It was ranked as AA where neither gelation nor deposition of insoluble matter occurred, and the dispersing state was hence good, A where the dispersing state was good, but the Viscosity was slightly high, or C where gelation or deposition of insoluble matter occurred, resulting in a failure to disperse.

2) TI value

A Brookfield type viscometer (VISCOMETER, manufactured by TOKIMEC CO.) was used to determine a TI value in the above-described manner in accordance with the following equation:

TI value=viscosity at 6 rpm/viscosity at 60 rpm Rotor: No. 1, measuring temperature: 25° C.

3) Setting ability, viscosity ratio

The temperature of the dispersion was lowered at a rate of 1° C./min from 50° C. to measure its viscosity at temperatures down to 10° C by means of the same Brookfield type viscometer as that used above, an adapter for low viscosity and a No. 3 rotor (number of revolutions: 3 rpm). The ratios of the viscosity at 20° C. to the viscosity at 30° C., of the viscosity at 15° C. to the viscosity at 30° C. and of the viscosity at 15° C. to the viscosity at 20° C. were respectively determined.

4) pH of dispersion

The pH of the mixed dispersion of the alumina hydrate and the acid-processed gelatin in water was measured at a dispersion temperature of 25° C. by means of the same pH meter (HM-40S, manufactured by Toa Electronics Ltd.) as that used in the measurement for the gelatins.

Evaluating and measuring methods of physical properties of ink-receiving layer

1) Coating state of ink-receiving layer

The coating state was visually evaluated. It was ranked as A where a smooth surface was formed, and the coating state was hence good, or C where the surface developed defects such as formation of a rough surface or deposition of insoluble matter.

2) pH of medium

The measurement was conducted by means of the same pH meter as that used in the measurement for the dispersions in accordance with the method (cold-water extraction method) prescribed in JIS P 8133.

3) Printability

Using an ink-jet printer equipped with four recording heads for yellow, magenta, cyan and black inks, each of said heads having 128 nozzles in a proportion of 16 nozzles per mm, ink-jet recording was conducted with inks of the following compositions, thereby evaluating the recording media in ink-drying ability (absorptiveness), optical density of an image, bleeding, beading, glossiness and variation in maximum absorption spectrum.

(a) Ink-drying ability

After single-color or multi-color solid printing was conducted with the yellow, magenta, cyan and black inks of the following ink composition 1, the recorded area of each recording medium was touched with a finger to determine the drying condition of the inks on the surface of the recording medium. The quantity of ink in the single-color printing was determined as 100%. The ink-drying ability was ranked as AA where none of the inks adhered to the finger in an ink quantity of 300%, A where none of the inks adhered to the finger in an ink quantity of 200%, or B where none of the inks adhered to the finger in an ink quantity of 100%.

(b) Optical density

Solid printing was conducted separately with the yellow, magenta, cyan and black inks of the following ink composition 1. The optical density of each of the images formed was determined by means of a Macbeth reflection densitometer RD-918. (In each of the examples, the optical density of the image formed with the magent ink of the four inks was lowest.)

(c) Bleeding and beading

After single-color or multi-color solid printing was conducted with the yellow, magenta, cyan and black inks of the following ink composition 1, the recording media were evaluated by whether bleeding occurred on their surfaces. Besides, single-color or multi-color solid printing was conducted with the respective yellow, magenta, cyan and black inks of the following two ink compositions to visually evaluate the recording media by whether beading occurred. The quantity of ink in the single-color printing was determined as 100%. The resistance to bleeding or the resistance to beading of the recording media was ranked as AA where bleeding or beading did not occur in an ink quantity of 300%, A where bleeding or beading did not occur in an ink quantity of 200%, or B where bleeding or beading did not occur in an ink quantity of 100%.

| | |
|---|---|
| Ink composition 1: | |
| Dye | 5 parts |
| Ethylene glycol | 10 parts |
| Polyethylene glycol | 10 parts |
| Water | 75 parts. |
| Ink composition 2: | |
| Dye | 5 parts |
| Glycerol | 15 parts |
| Polyethyiene glycol | 20 parts |
| Water | 70 parts. |
| Dye in ink: | |
| Yellow (Y): C.I. Direct Yellow 86 | |
| Magenta (M): C.I. Acid Red 35 | |
| Cyan (C): C.I. Direct Blue 199 | |
| Black (Bk): C.I. Food Black 2. | |

Glossiness was measured on a white area (non-printed area) and a black area (printed area of Bk 100%+C 50%+M 50%+Y 50%) by means of a glossmeter (Glosschecker IG-320, manufactured by Horiba Ltd.).

(e) Variation in maximum absorption spectrum

The maximum absorption spectra λ1 of the respective inks of the composition 1 and the maximum absorption spectra λ2 of printed areas on each recording medium printed with the respective inks were measured by means of a spectrophotometer (Hitachi Autographic Spectrophotometer U-3410, manufactured by Hitachi Ltd.), thereby determining absolute values of variations (cyan: ΔλC, magenta: ΔλM) in maximum absorption spectra of the respective colors.

Referential Example 1

A recording medium was obtained in the same manner as in Example 1 except that a 10% by weight solution of polyvinyl alcohol (Gohsenol NH18, product of The Nippon Synthetic Chemical Industry Co., Ltd.) in deionized water and a 15% by weight dispersion of the alumina hydrate (A) in deionized water were weighed out to give a P/B ratio of 10:1.

Printing was conducted with the inks of the composition 1 on the thus-obtained recording medium. As a result, change in tint was recognized even by naked eyes. Variations in maximum absorption spectra were determined and were found to be 41 nm for ΔλC and 22 nm for ΔλM.

Referential Example 2

A dispersion was prepared and a recording medium was obtained in the same manner as in Example 1 except that no gelatin was used. The results are shown in Table 5.

Comparative Example 1

A cast-coated paper web (Mirrorcoat, product of Kanzaki Seishi K.K.) was used to measure glossiness. As a result, the glossiness was 59.9 at a white area or 37.2 at a black area. The glossiness at the printed area was reduced by more than 20, so that the image quality became poor.

Examples 46 to 57

Alkaline earth metaseparatshown in Table 6 were separately added in varied amounts to the same acid-processed gelatin as that used in Example 1 to swell and dissolve the gelatin in deionized water, thereby preparing 20% by weight solutions. Each of these solutions was mixed with a 20% by weight dispersion of the same alumina hydrate as that used in Example 1 to give a P/B ratio of 10/1. The resulting mixtures were separately stirred by a disperser (T. K. Homomixer M type, manufactured by Tokushu Kika Kogyo Co., Ltd.), thereby preparing mixed dispersions. Each of the resultant dispersions was applied by a wire bar to one side of a resin-coated paper web to obtain a recording medium. The physical properties of the mixed dispersions and recording media thus prepared are shown in Table 6.

Here, the dispersion containing no alkaline earth methal ion had a viscosity of 220 cP and a glossiness of 63.0

Example 58 to 100

Mixed dispersions were prepared by separately weighing out their corresponding 10% by weight solutions of the gelatins (a2 to h2) in deionized water shown in Table 7 and their corresponding 15% by weight dispersions of alumina hydrates (A to H) in deionized water shown in Table 7 to give their corresponding P/B ratios shown in Table 7, and mixing under stirring the respective solutions and dispersions with each other for 30 minutes at 8,000 rpm by a disperser (T. K. Homomixer M type, manufactured by Tokushu Kika Kogyo Co., Ltd.).

Each of the resultant dispersions was applied by a slide hopper system to one side of a resin-coated paper web (product of Oji Paper Co., Ltd., thickness: 238 μm, basis weight: 249.8 g/m$^2$, brightness by the whole light: 91.58; RC), a white polyester film (Lumiror X-21, trade name, product of Toray Industries, Inc., thickness: 100 μm; WP) or a transparent polyester film (Lumiror T, trade name, product of Toray Industries, Inc., thickness: 100 μm; TP) to form an ink-receiving layer having a thickness of 30 μm, thereby obtaining a recording medium. The physical properties of the mixed dispersions and the resulting ink-receiving layers were measured in the same manner as in Examples 1 to 45. The results are shown in Table 7.

TABLE 1

| Physical properties | Acid-processed gelatin | | | | | |
|---|---|---|---|---|---|---|
| | a1 | b1 | c1 | d1 | e1 | f1 |
| Mw | 120000 | 100000 | 160000 | 68000 | 29000 | 20000 |
| Mn | 42000 | 41000 | 71000 | 32000 | 22000 | 17000 |
| Jelly strength (g) | 303 | 307 | 297 | 206 | 50 | 1 |
| pH | 5.8 | 7.0 | 8.4 | 6.6 | 6.5 | 6.0 |
| Isoionic point | 6.8 | 7.1 | 9.1 | 6.7 | 6.7 | 6.2 |
| Zeta-potential | 9.40 | 4.88 | 1.41 | −5.78 | −6.68 | −12.59 |
| Particle diameter (nm) | 103 | 110 | 115 | 33 | 461 | 112 |
| Swelling rate with water (%) | 1143 | 1230 | 1954 | 1023 | 1309 | 895 |
| Swelling rate with ethylene glycol (%) | 860 | 845 | 1330 | 591 | 1231 | 320 |

TABLE 2

| Physical properties | Alkali-processed gelatin | | | | | | | |
|---|---|---|---|---|---|---|---|---|
| | a2 | b2 | c2 | d2 | e2 | f2 | g2 | h2 |
| Mw | 8900 | 16000 | 19000 | 72000 | 39000 | 79000 | 43000 | 120000 |
| Mn | 12000 | 14000 | 16000 | 37000 | 25000 | 40000 | 27000 | 42000 |
| Jelly strength (g) | 1 | 2 | 2 | 188 | 101 | 200 | 115 | 303 |
| pH | 6.5 | 6.1 | 6.0 | 5.0 | 5.1 | 6.0 | 5.9 | 5.8 |
| Isoionic point | 5.0 | 4.9 | 4.9 | 5.0 | 5.1 | 5.0 | 5.1 | 6.8 |
| Zeta-potential | −18.0 | −17.7 | −7.5 | −12.0 | −20.5 | −11.5 | −22.5 | 9.40 |
| Particle diameter (nm) | 390 | 500 | 390 | 115 | 109 | 117 | 107 | 103 |
| Swelling rate with water (%) | 701 | 753 | 805 | 1062 | 1105 | 1089 | 1080 | 1143 |
| Swelling rate with ethylene glycol (%) | 303 | 320 | 359 | 613 | 802 | 646 | 843 | 860 |

TABLE 3

| Physical properties | Alumina hydrate | | | |
|---|---|---|---|---|
| | A | B | C | D |
| Average particle diameter (nm) | 43 | 39 | 32 | 26 |
| Aspect ratio | 3.3 | 6.1 | 7.9 | 9.9 |
| BET specific surface area ($m^2/g$) | 76 | 93 | 135 | 200 |
| Average pore radius (Å) | 123 | 85 | 44 | 30 |
| Half breadth (Å) | 100 | 40 | 40 | 20 |
| Peak 1 of pore distribution (Å) | 125 | 110 | — | — |
| Peak 2 of pore distribution (Å) | 17 | 30 | — | — |
| Pore volume (cc/g) | 0.57 | 0.55 | 0.55 | 0.51 |
| Volume ratio of peak 2 (%) | 5 | 8 | — | — |
| Aging temperature (°C.) | 30 | 45 | 180 | 120 |
| Aging period | 2 weeks | 12 days | 3 hours | 5 hours |

TABLE 3-continued

| Physical properties | Alumina hydrate | | | |
|---|---|---|---|---|
| | A | B | C | D |
| Aging apparatus | Oven | Oven | Autoclave | Autoclave |

TABLE 4

| Physical properties | Alumina hydrate | | | |
|---|---|---|---|---|
| | E | F | G | H |
| Titanium dioxide content | 0.150 | 0.140 | 0.150 | 0.140 |
| Average particle diameter (nm) | 45.0 | 38.0 | 40.0 | 30.0 |
| Aspect ratio | 3.5 | 5.6 | 3.5 | 8.1 |

TABLE 4-continued

| Physical properties | Alumina hydrate | | | |
|---|---|---|---|---|
| | E | F | G | H |
| BET specific surface area ($m^2/g$) | 76 | 93 | 93 | 140 |
| Average pore radius (Å) | 130 | 65 | 70 | 60 |
| Half breadth (Å) | 100 | 40 | 20 | 20 |
| Peak 1 of pore distribution (Å) | — | — | 120 | 140 |
| Peak 2 of pore distribution (Å) | — | — | 40 | 50 |
| Pore volume (cc/g) | 0.57 | 0.55 | 0.57 | 0.55 |
| Volume ratio of peak 2 (%) | — | — | 5 | 10 |
| Aging temperature (°C.) | 110 | 150 | 40 | 50 |
| Aging period | 8 hours | 4 hours | 4 weeks | 3 weeks |
| Aging apparatus | Autoclave | Autoclave | Oven | Oven |

TABLE 5

| Example | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| Alumina hydrate | A | A | A | A | A | A | A | A | A | A | A | A | A | A | A | A | B | B |
| Gelatin | a1 | a1 | a1 | a1 | a1 | a1 | a1 | b1 | b1 | b1 | c1 | d1 | d1 | d1 | e1 | f1 | a1 | d1 |
| P/B ratio | 5/1 | 7/1 | 10/1 | 10/1 | 10/1 | 15/1 | 20/1 | 10/1 | 10/1 | 10/1 | 10/1 | 10/1 | 10/1 | 10/1 | 10/1 | 10/1 | 10/1 | 10/1 |
| Dispersing state | AA | AA | AA | AA | AA | AA | AA | AA | AA | AA | A | AA | AA | AA | AA | AA | AA | AA |
| TI value | 3.6 | 3.5 | 3.4 | — | — | 3.2 | 3.0 | 3.4 | — | — | 2.5 | 3.5 | — | — | 3.6 | 3.2 | 3.4 | 3.2 |
| Base material | WP | WP | WP | RC | TP | WP | WP | WP | RC | TP | WP | WP | RC | TP | WP | WP | WP | WP |
| Coating of ink-receiving layer | A | A | A | A | A | A | A | A | A | A | A | A | A | A | A | A | A | |
| Ink-drying ability | B | AA | AA | AA | AA | AA | AA | AA | AA | AA | AA | AA | AA | AA | AA | AA | AA | AA |
| Optical density | 1.59 | 1.76 | 1.85 | — | — | 1.80 | 1.85 | 1.84 | — | — | 1.83 | 1.82 | — | — | 1.80 | 1.80 | 1.82 | 1.80 |
| Bleeding | B | A | AA | AA | AA | AA | AA | AA | AA | AA | A | AA | AA | AA | AA | AA | AA | AA |
| Beading | B | A | AA | AA | AA | AA | AA | AA | AA | AA | AA | AA | AA | AA | AA | AA | AA | AA |
| Glossiness (white area) | 65.0 | 62.0 | 62.5 | — | — | 60.0 | 63.0 | 62.5 | — | — | 55.0 | 63.5 | — | — | 64.0 | 64.5 | 61.5 | 62.0 |
| Glossiness (black area) | 69.5 | 67.5 | 67.5 | — | — | 65.0 | 66.5 | 68.0 | — | — | 58.5 | 67.0 | — | — | 67.5 | 67.5 | 65.0 | 66.5 |
| $\Delta\lambda$ C (nm) | — | — | 6 | 5 | 6 | — | — | 5 | 5 | 6 | — | 6 | 5 | 4 | — | — | — | — |
| $\Delta\lambda$ M (nm) | — | — | 4 | 3 | 3 | — | — | 2 | 2 | 4 | — | 4 | 4 | 4 | — | — | — | — |
| pH of dispersion | 6.3 | 6.0 | 5.9 | — | — | 5.9 | 5.9 | 6.4 | — | — | 8.0 | — | — | — | — | — | — | — |
| pH of medium | — | — | 5.7 | — | — | — | — | 6.2 | — | — | 7.5 | — | — | — | — | — | — | — |
| Viscosity ratio of 20° C./30° C. | 2.00 | 1.14 | 1.39 | — | — | — | — | 2.63 | — | — | 291 | — | — | — | — | — | — | — |
| Viscosity ratio of 15° C./30° C. | 18.6 | 2.29 | 2.92 | — | — | — | — | 7.35 | — | — | 1000 | — | — | — | — | — | — | — |
| Viscosity ratio of 15° C./20° C. | 9.3 | 2.0 | 2.1 | — | — | — | — | 2.8 | — | — | 3.4 | — | — | — | — | — | — | — |

| Example | 19 | Ref. 1 | Ref. 2 | 20 | 21 | 22 | 23 | 24 | 25 | 26 | 27 | 28 | 29 | 30 | 31 | 32 | 33 |
|---|---|---|---|---|---|---|---|---|---|---|---|---|---|---|---|---|---|
| Alumina hydrate | C | A | A | C | D | D | E | E | F | F | F | F | F | F | F | F | G |
| Gelatin | d1 | PVA | — | e1 | d1 | e1 | a1 | d1 | a1 | a1 | a1 | c1 | d1 | d1 | d1 | e1 | a1 |
| P/B ratio | 10/1 | 10/1 | — | 10/1 | 10/1 | 10/1 | 10/1 | 10/1 | 10/1 | 10/1 | 10/1 | 10/1 | 10/1 | 10/1 | 10/1 | 10/1 | 10/1 |
| Dispersing state | A | AA | AA | AA | A | AA | AA | AA | AA | AA | AA | A | AA | AA | AA | AA | AA |
| TI value | 1.9 | — | — | 2.5 | 1.9 | 2.5 | 3.3 | 3.5 | 3.4 | — | — | 2.5 | 3.5 | — | — | 3.6 | 3.3 |
| Base material | WP | WP | — | WP | WP | WP | WP | WP | WP | RC | TP | WP | WP | RC | TP | WP | WP |
| Coating of ink-receiving layer | A | A | — | A | A | A | A | A | A | A | A | A | A | A | A | A | A |
| Ink-drying ability | A | B | — | A | A | A | AA | AA | AA | AA | AA | AA | AA | AA | AA | AA | AA |
| Optical density | 1.83 | 180 | — | 1.84 | 1.82 | 1.85 | 1.94 | 1.90 | 1.94 | — | — | 1.93 | 1.91 | — | — | 1.92 | 1.94 |
| Bleeding | A | A | — | AA | A | AA | AA | AA | AA | AA | AA | A | AA | AA | AA | AA | AA |
| Beading | B | A | — | B | B | B | AA | AA | AA | AA | AA | AA | AA | AA | AA | AA | AA |
| Glossiness (white area) | 55.0 | — | — | 61.5 | 55.5 | 61.0 | 63.5 | 63.5 | 63.0 | — | — | 56.5 | 63.5 | — | — | 64.0 | 62.5 |
| Glossiness (black area) | 58.0 | — | — | 63.0 | 58.5 | 63.5 | 67.5 | 67.5 | 67.5 | — | — | 58.5 | 67.5 | — | — | 68.0 | 67.5 |
| $\Delta\lambda$ C (nm) | — | — | — | — | — | — | — | — | 6 | 4 | 5 | — | 5 | 4 | 6 | — | — |
| $\Delta\lambda$ M (nm) | — | — | — | — | — | — | — | — | 4 | 2 | 3 | — | 3 | 2 | 0 | — | — |
| pH of dispersion | — | 5.2 | 5.0 | | | | | | | | | | | | | | |
| pH of medium | — | 5.1 | — | | | | | | | | | | | | | | |
| Viscosity ratio of 20° C./30° C. | — | 1.77 | — | | | | | | | | | | | | | | |
| Viscosity ratio of 15° C./30° C. | — | 2.58 | — | | | | | | | | | | | | | | |
| Viscosity ratio of 15° C./20° C. | — | 1.46 | — | | | | | | | | | | | | | | |

| Example | 34 | 35 | 36 | 37 | 38 | 39 | 40 | 41 | 42 | 43 | 44 | 45 |
|---|---|---|---|---|---|---|---|---|---|---|---|---|
| Alumina hydrate | G | H | H | A | A | A | C | F | F | A | A/C (1/1) | F/H (1/1) |
| Gelatin | d1 | d1 | e1 | a1/f1 (9/1) | a1/e1 (9/1) | a1/d1 (7/3) | d1/f1 (3/7) | a1/f1 (9/1) | a1/d1 (6/4) | a1/d1/e1 (6/2/2) | d1/e1/f1 (2/4/4) | d1/e1/f1 (2/4/4) |
| P/B ratio | 10/1 | 10/1 | 10/1 | 10/1 | 10/1 | 10/1 | 10/1 | 10/1 | 10/1 | 10/1 | 10/1 | 10/1 |
| Dispersing state | AA | A | AA | AA | AA | AA | AA | AA | AA | AA | AA | AA |
| TI value | 3.5 | 1.8 | 3.0 | 3.1 | 3.6 | 4.0 | 1.7 | 3.3 | 4.0 | 4.0 | 2.5 | 3.0 |
| Base material | WP | WP | WP | RC | RC | RC | TP | RC | RC | RC | TP | TP |
| Coating of ink-receiving layer | A | A | A | A | A | A | A | A | A | A | A | A |
| Ink-drying ability | AA | A | A | AA | AA | AA | A | AA | AA | AA | AA | AA |
| Optical density | 1.91 | 1.93 | 1.92 | 1.80 | 1.82 | 1.84 | 1.80 | 1.92 | 1.84 | 1.84 | 1.80 | 1.91 |
| Bleeding | AA | AA | AA | AA | AA | AA | AA | AA | AA | AA | AA | AA |
| Beading | AA | B | B | AA | AA | AA | B | AA | AA | AA | AA | AA |
| Glossiness (white area) | 63.0 | 56.5 | 62.5 | 63.0 | 63.5 | 63.5 | 63.5 | 63.0 | 63.5 | 64.0 | 59.5 | 60.0 |
| Glossiness (black area) | 67.5 | 59.0 | 65.5 | 67.5 | 67.5 | 67.5 | 68.0 | 67.5 | 68.0 | 68.0 | 61.0 | 63.5 |
| $\Delta\lambda$ C (nm) | — | — | — | 6 | 5 | 5 | — | 5 | 4 | — | — | — |
| $\Delta\lambda$ M (nm) | — | — | — | 2 | 0 | 1 | — | 3 | 3 | — | — | — |

TABLE 6

| Example | 46 | 47 | 48 | 49 | 50 | 51 | 52 | 53 | 54 | 55 | 56 | 57 |
|---|---|---|---|---|---|---|---|---|---|---|---|---|
| Alkaline earth metal ion | $Ca^{2+}$ | $Ca^{2+}$ | $Ca^{2+}$ | $Ca^{2+}$ | $Mg^{2+}$ | $Mg^{2+}$ | $Mg^{2+}$ | $Mg^{2+}$ | $Sr^{2+}$ | $Sr^{2+}$ | $Ba^{2+}$ | $Ba^{2+}$ |
| Alkaline earth metal ion/ gelatin (ppm) | 100 | 500 | 2000 | 3000 | 200 | 800 | 1500 | 2400 | 500 | 2000 | 500 | 2000 |
| Viscosity (cP) | 68.5 | 40.5 | 45.2 | 73.2 | 70.5 | 43.3 | 42.1 | 65.8 | 48.3 | 53.2 | 50.2 | 56.6 |
| Glossiness (white area) | 63.0 | 64.2 | 63.2 | 60.0 | 63.5 | 64.0 | 63.8 | 60.0 | 62.5 | 62.0 | 62.3 | 61.5 |

TABLE 7

| Example | 58 | 59 | 60 | 61 | 62 | 63 | 64 | 65 | 66 | 67 | 68 | 69 | 70 | 71 | 72 | 73 | 74 | 75 | 76 |
|---|---|---|---|---|---|---|---|---|---|---|---|---|---|---|---|---|---|---|---|
| Alumina hydrate | A | A | A | A | A | A | A | A | A | A | A | A | B | B | B | B | C | C | C |
| Gelatin | a2 | b2 | c2 | d2 | D2 | D2 | e2 | b2 | b2 | d2 | e2 | e2 | b2 | d2 | e2 | g2 | b2 | b2 | b2 |
| P/B ratio | 10/1 | 10/1 | 10/1 | 10/1 | 10/1 | 10/1 | 10/1 | 5/1 | 15/1 | 5/1 | 5/1 | 15/1 | 10/1 | 10/1 | 10/1 | 10/1 | 10/1 | 10/1 | 10/1 |
| Dispersing state | AA | AA | AA | AA | AA | AA | AA | AA | AA | AA | AA | AA | AA | AA | AA | AA | AA | AA | AA |
| TI value | 2.8 | 2.9 | 2.9 | 3.6 | 3.6 | 3.6 | 3.2 | 2.6 | 3.2 | 3.0 | 2.9 | 3.5 | 2.5 | 3.5 | 2.9 | 3.2 | 1.6 | 1.6 | 1.6 |
| Base material | WP | WP | WP | WP | RC | TP | WP | WP | WP | WP | WP | WP | WP | WP | WP | WP | WP | RC | TP |
| Coating of ink-receiving layer | A | A | A | A | A | A | A | A | A | A | A | A | A | A | A | A | A | A | A |
| Ink-drying ability | AA | AA | AA | AA | AA | AA | AA | AA | AA | AA | AA | AA | AA | AA | AA | AA | A | A | A |
| Optical density | 1.84 | 1.83 | 1.82 | 180 | 1.82 | 1.82 | 1.82 | 1.85 | 1.83 | 1.84 | 1.85 | 1.81 | 1.83 | 1.80 | 1.82 | 1.82 | 1.70 | 1.73 | 1.70 |
| Bleeding | AA | AA | AA | AA | AA | AA | AA | AA | AA | AA | AA | AA | AA | AA | AA | AA | A | A | A |
| Beading | AA | AA | AA | AA | AA | AA | AA | AA | AA | AA | AA | AA | AA | AA | AA | AA | A | A | A |
| Glossiness (white area) | 65.5 | 65.0 | 65.5 | 60.5 | 62.5 | — | 62.5 | 66.0 | 64.5 | 62.5 | 63.5 | 60.5 | 65.0 | 61.0 | 63.0 | 63.5 | 59.5 | 60.5 | — |
| Glossiness (black area) | 68.5 | 67.0 | 66.0 | 61.5 | 64.0 | — | 63.0 | 68.0 | 66.5 | 63.0 | 65.0 | 62.0 | 67.0 | 62.0 | 64.5 | 64.0 | 59.5 | 62.0 | — |
| $\Delta\lambda$ C (nm) | — | — | — | 5 | 6 | 5 | — | — | — | — | — | — | — | — | — | — | 6 | 6 | 7 |
| $\Delta\lambda$ M (nm) | — | — | — | 3 | 4 | 2 | — | — | — | — | — | — | — | — | — | — | 4 | 4 | 3 |
| pH of dispersion | 6.4 | 6.1 | 6.0 | — | — | — | — | — | — | — | — | — | — | — | — | — | — | — | — |
| pH of medium | 6.2 | 6.0 | 5.8 | — | — | — | — | — | — | — | — | — | — | — | — | — | — | — | — |
| Viscosity ratio of 20° C./ 30° C. | 1.10 | 1.40 | 1.60 | 2.0 | — | — | — | — | — | — | — | — | — | — | — | — | — | — | — |
| Viscosity ratio of 15° C./ 30° C. | 2.20 | 3.00 | 4.00 | 9.0 | — | — | — | — | — | — | — | — | — | — | — | — | — | — | — |
| Viscosity ratio of 15° C./ 20° C. | 2.0 | 2.1 | 2.50 | 4.50 | — | — | — | — | — | — | — | — | — | — | — | — | — | — | — |

| Example | 77 | 78 | 79 | 80 | 81 | 82 | 83 | 84 | 85 | 86 | 87 | 88 | 89 | 90 | 91 | 92 | 93 | 94 |
|---|---|---|---|---|---|---|---|---|---|---|---|---|---|---|---|---|---|---|
| Alumina hydrate | C | D | D | E | F | F | F | F | F | F | G | G | G | H | H | A | A | |
| Gelatin | g2 | b2 | g2 | b2 | d2 | b2 | d2 | d2 | d2 | E2 | g2 | b2 | d2 | g2 | b2 | g2 | b2/d2 (3/7) | b2/h2 (8/2) |
| P/B ratio | 10/1 | 10/1 | 5/1 | 10/1 | 10/1 | 10/1 | 10/1 | 10/1 | 10/1 | 10/1 | 10/1 | 10/1 | 10/1 | 10/1 | 10/1 | 7/1 | 10/1 | 10/1 |
| Dispersing state | A | AA | AA | AA | AA | AA | AA | AA | AA | AA | AA | AA | AA | AA | AA | A | AA | AA |
| TI value | 1.9 | 1.6 | 1.9 | 2.5 | 3.5 | 2.5 | 3.6 | 3.6 | 3.6 | 2.7 | 2.8 | 2.5 | 2.9 | 2.0 | 1.7 | 1.9 | 3.0 | 3.8 |
| Base material | WP | WP | WP | WP | WP | WP | WP | RC | TP | WP | WP | WP | WP | WP | WP | WP | RC | RC |
| Coating of ink-receiving layer | A | A | A | A | A | A | A | A | A | A | A | A | A | A | A | A | A | A |
| Ink-drying ability | B | A | A | AA | AA | AA | AA | AA | AA | AA | AA | A | A | A | A | B | AA | AA |
| Optical density | 1.65 | 1.71 | 1.63 | 1.91 | 1.91 | 1.93 | 1.91 | 1.93 | 1.90 | 1.92 | 1.94 | 1.81 | 1.84 | 1.85 | 1.80 | 1.75 | 1.85 | 1.83 |
| Bleeding | B | A | A | AA | AA | AA | AA | AA | AA | AA | AA | A | A | A | A | B | AA | AA |
| Beading | B | A | A | AA | AA | AA | AA | AA | AA | AA | AA | A | A | A | A | B | AA | AA |
| Glossiness (white are) | 56.5 | 58.5 | 59.0 | 63.0 | 60.0 | 65.0 | 60.5 | 62.0 | — | 62.5 | 63.0 | 63.0 | 60.0 | 62.5 | 57.5 | 57.0 | 65.5 | 65.5 |

TABLE 7-continued

| | | | | | | | | | | | | | | | | | | |
|---|---|---|---|---|---|---|---|---|---|---|---|---|---|---|---|---|---|---|
| Glossiness (black area) | 58.0 | 59.5 | 59.0 | 65.0 | 59.5 | 67.5 | 60.0 | 63.5 | — | 63.5 | 65.5 | 65.5 | 61.5 | 64.0 | 59.5 | 58.5 | 69.0 | 68.5 |
| Δλ C (nm) | — | — | — | — | — | — | 5 | 7 | 6 | — | — | — | — | — | — | — | 7 | 5 |
| Δλ M (nm) | — | — | — | — | — | — | 3 | 3 | 3 | — | — | — | — | — | — | — | 4 | 3 |

| Example | 95 | 96 | 97 | 98 | 99 | 100 |
|---|---|---|---|---|---|---|
| Alumina hydrate | B | C | C | F | A/C (1/1) | F/H (1/1) |
| Gelatin | b2/f2 (2/8) | b2/g2 (4/6) | b2/g2 (4/6) | b2/g2 (3/7) | b2/d2/g2 (1/4/2) | b2/d2/g2 (1/4/2) |
| P/B ratio | 10/1 | 10/1 | 10/1 | 10/1 | 10/1 | 10/1 |
| Dispersing state | AA | A | A | AA | A | A |
| TI value | 3.1 | 1.7 | 1.7 | 3.0 | 2.2 | 2.0 |
| Base material | WP | RC | TP | RC | RC | TP |
| Coating of ink-receiving layer | A | A | A | A | A | A |
| Ink-drying ability | AA | B | B | AA | A | A |
| Optical density | 1.83 | 1.72 | 1.70 | 1.90 | 1.75 | 1.83 |
| Bleeding | AA | B | B | AA | A | A |
| Beading | AA | B | B | AA | A | A |
| Glossiness (white area) | 65.0 | 59.5 | — | 65.5 | 60.0 | 59.5 |
| Glossiness (black area) | 68.5 | 612.0 | — | 68.0 | 62.0 | 61.0 |
| C (nm) | — | 6 | — | 5 | 6 | 6 |
| M (nm) | — | 2 | — | 4 | 4 | 4 |

The present invention has the following advantageous effects:

1) The use of the acid-processed or alkali-processed gelatin as a binder to make good use of the solgel converting ability (setting ability) of the gelatin permits the stable formation of an ink-receiving layer having a satisfactory thickness with good productivity. Therefore, there can be provided images sufficient in resolution and good in quality.

2) The use of the acid-processed or alkali-processed gelatin as a binder permits the provision of a recording medium having an ink-receiving layer which causes no change in tint owing to the buffer action of the gelatin even if an alumina hydrate high in acidity is used, and exhibiting good color reproducibility.

3) Moderate thixotropic property, which is exhibited by a dispersion obtained by mixing and dispersing the specific alumina hydrate and acid-processed or alkali-processed gelatin, effectively serves to form an ink-receiving layer having a satisfactory thickness.

4) A recording medium having an ink-receiving layer high in gloss can be provided. In particular, when resin-coated paper is used as a base material, the recording medium can be provided as a recording medium having the same glossy feeling, feeling to the touch and texture as those of a usual photoprint. Besides, according to the recording medium, the gloss of the printed area is as high as that of the non-printed area, and so images high in quality can be provided.

5) Both dye-adsorbing ability and dispersibility can be improved by having titanium dioxide contained in the alumina hydrate. Since the viscosity of the dispersion can be kept low even if the solids concentration of the dispersion is high, the coating thickness of the ink-receiving layer can be thickened. Further, since the adsorption and fixing of an ink upon printing can be improved, changes with time can be prevented.

6) Since titanium dioxide is colorless, the ink-receiving layer is not colored even when it is added.

7) When the alumina hydrate in the form of a flat plate is used, the spaces among its particles can be widened if the closest packing is adopted. Therefore, there can be obtained a medium having pores considerably wide in pore radius distribution. Individual dyes and solvent components in inks are selectively adsorbed to pores having a specific radius. Therefore, when a medium having wide pore radius distribution is used, printability becomes hard to be affected by the composition of ink. Accordingly, selectivity to the composition of ink becomes higher.

8) Since the individual pigments or ink-receiving layers have at least two peaks in pore radius distribution, the function of the pores can be divided. Since a dye in an ink is effectively adsorbed to pores having a relatively small radius, images good in resolution and sufficient in optical density can be provided. Since a solvent component in the ink can be quickly absorbed in pores having a relatively large radius, images free of beading, bleeding and running of the ink and good in resolution can be provided.

9) Since the recording media have no hysteresis, the solvent component in the ink is easy to be desorbed. Therefore, the ink-drying ability of the media is improved, and so bleeding and setoff can be prevented.

10) Since the alumina hydrate has good dispersibility, the viscosity of a dispersion can be kept low if the solids concentration of the dispersion is high.

11) Since the alumina hydrate has good dispersibility even at a neutral region near pH 7, the amount of an acid added to the dispersion can be decreased.

12) When an alkaline earth metal ion is contained in a specific amount in a dispersion containing the acid-processed gelatin, the viscosity of the dispersion can be kept low even if the solids concentration of the dispersion is high. Besides, a recording medium prepared by using such a dispersion is high in surface gloss.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded to the broadest interpretation so as to encompass all such modifications and equivalent structures and functions.

What is claimed is:

1. A recording medium comprising a substrate and an ink-receiving layer thereon which comprises an alumina hydrate as a main component and, as a binder, acid-processed gelatin, wherein the gelatin has a weight average molecular weight within a range of from 20,000 to 200,000 as measured in accordance with the PAGI method.

2. The recording medium according to claim 1, wherein the jelly strength of the gelatin is within a range of from 1 to 400 as measured in accordance with the PAGI method.

3. The recording medium according to claim 1, wherein the pH of the gelatin is within a range of from 9.0 down to 5.5 as measured in accordance with the PAGI method.

4. The recording medium according to claim 1, wherein the isoionic point of the gelatin is within a range of from 9.5 down to 5.5 as measured in accordance with the PAGI method.

5. The recording medium according to claim 1, wherein the pH and isoionic point of the gelatin are within ranges of from 9.0 down to 5.5 and from 9.5 down to 5.5, respectively, as measured in accordance with the PAGI method.

6. The recording medium according to claim 5, wherein the pH and isoionic point of the gelatin satisfy the following relationship:

$$(pH \text{ value } -0.1) \leqq \text{isoionic point.}$$

7. The recording medium according to claim 1, wherein the zeta-potential of the gelatin is at least −15 mV as measured in the form of a 0.1% aqueous solution.

8. The recording medium according to claim 1, wherein the ink-receiving layer contains an alkaline earth metal ion in an amount of 100 to 3,000 ppm based on the gelatin.

9. The recording medium according to claim 1, wherein the gelatin has a weight average molecular weight within 20,000 to 180,000 as measured in accordance with the PAGI method.

10. The recording medium according to claim 1, wherein the gelatin has a weight average molecular weight within 20,000 to 170,000 as measured in accordance with the PAGI method.

11. The recording medium according to claim 1, wherein the gelatin has a number average molecular weight within 10,000 to 100,000 as measured in accordance with the PAGI method.

12. The recording medium according to claim 1, wherein the gelatin has a number average molecular weight within 14,000 to 85,000 as measured in accordance with the PAGI method.

13. A recording medium comprising a substrate and an ink-receiving layer thereon which comprises an alumina hydrate as a main component and, as a binder, alkali-processed gelatin, wherein the gelatin has a weight average molecular weight within a range of from 5,000 to 100,000 as measured in accordance with the PAGI method.

14. The recording medium according to claim 13, wherein the jelly strength of the gelatin is within a range of from 1 to 300 as measured in accordance with the PAGI method.

15. The recording medium according to claim 13, wherein the pH of the gelatin is within a range of from 4.5 to 7.0 as measured in accordance with the PAGI method.

16. The recording medium according to claim 13, wherein the isoionic point of the gelatin is within a range of from 4.1 to 6.0 as measured in accordance with the PAGI method.

17. The recording medium according to claim 13, wherein the pH and isoionic point of the gelatin are within ranges of from 4.5 to 7.0 and from 4.1 to 6.0, respectively, as measured in accordance with the PAGI method.

18. The recording medium according to claim 17, wherein the pH and isoionic point of the gelatin satisfy the following relationship:

$$pH \text{ value} \geqq (\text{isoionic point } -0.1).$$

19. The recording medium according to claim 13, wherein the zeta-potential of the gelatin is at most 0 mV as measured in the form of a 0.1% aqueous solution.

20. The recording medium according to claim 13, wherein the gelatin has a weight average molecular weight within 7,000 to 95,000 as measured in accordance with the PAGI method.

21. The recording medium according to claim 13, wherein the gelatin has a number average molecular weight within 5,000 to 65,000 as measured in accordance with the PAGI method.

22. The recording medium according to claim 13, wherein the gelatin has a number average molecular weight within 8,000 to 50,000 as measured in accordance with the PAGI method.

23. The recording medium according to claim 1 or 13, wherein the swelling rate of the gelatin in water is at least 500%.

24. The recording medium according to claim 1 or 13, wherein the swelling rate of the gelatin in ethylene glycol is at least 300%.

25. The recording medium according to claim 1 or 13, wherein the alumina hydrate contains titanium oxide in an amount of 0.01 to 1.00% by weight.

26. The recording medium according to claim 1 or 13, wherein the alumina hydrate is in the form of a needle having an aspect ratio of not higher than 3 and unidirectionally orientates so as to aggregate like a bundle.

27. The recording medium according to claim 1 or 13, wherein the alumina hydrate is in the form of a flat plate having an average aspect ratio of 3 to 10.

28. The recording medium according to claim 1 or 13, wherein the alumina hydrate is non-crystalline.

29. The recording medium according to claim 1 or 13, wherein the alumina hydrate has a BET specific surface area within a range of from 70 to 300 $m^2/g$.

30. The recording medium according to claim 1 or 13, wherein the weight ratio in terms of solids concentration of the alumina hydrate to the gelatin is within a range of from 1:1 to 30:1.

31. An ink-jet recording method comprising ejecting minute droplets of an ink from an orifice to apply the droplets to a recording medium, thereby conducting printing, wherein the recording medium according to claim 1 or 13 is used as the recording medium.

32. The ink-jet recording method according to claim 31, wherein the minute droplets of the ink are formed by applying thermal energy to the ink.

33. The recording medium according to claim 1 or 13, wherein the alumina hydrate is represented by the following formula:

$$Al_2O_{3-n}(OH)_{2n} \cdot mH_2O$$

wherein n is an integer of 0 to 3, m is a number of 0 to 10, and n and m are not both zero.

34. The recording medium according to claim 1 or 13, wherein the ink-receiving layer has a thickness of at least 15 μm.

35. The recording medium according to claim 1 or 13, wherein the ink-receiving layer has a thickness of at least 20 μm.

36. The recording medium according to claim 1 or 13, wherein the ink-receiving layer has a thickness of at least 25 μm.

37. The recording medium according to claim 1 or 13, wherein the weight ratio, in terms of solids concentration, of the alumina hydrate to the gelatin is within a range of from 5:1 to 25:1.

38. An ink-jet recording method comprising ejecting minute droplets of an ink from an orifice to conduct printing, wherein the method satisfies the following relationship:

$$|\lambda 1-\lambda 2| \leqq 30\ nm$$

wherein λ1 denotes the maximum absorption wavelength of the ink, and λ2 is the maximum absorption wavelength of an area printed with the ink on a recording meidum comprising a subtrate and an ink-receiving layer thereon which comprises an alumina hydrate as a main component and, as a binder, acid-processed gelatin.

39. A print obtained by conducting printing with ink dots on a recording medium comprising a substrate and an ink-receiving layer thereon which comprises an aluminum hydrate as a main component and, as a binder, acid-processed gelatin, wherein a glossiness Gs1 (60) of a non-printed area and a glossiness Gs2 (60) of a printed area are both at least 40 as measured in accordance with JIS Z 8741.

40. A print obtained by conducting printing with ink dots on a recording medium comprising a substrate and an ink-receiving layer thereon which comprises an alumina hydrate as a main component and, as a binder, acid-processed gelatin, wherein the print satisfies the following relationship:

$$|Gs1\ (60)-Gs2\ (60)| \leqq 20$$

wherein Gs1 (60) and Gs2 (60) denote a glossiness of a non-printed area and a glossiness of a printed area, resprectively, as measured in accordance with JIS Z 8741.

41. An ink-jet recording method comprising ejecting minute droplets of an ink from an orifice to conduct printing, wherein the method satisfies the following relationship:

$$|\lambda 1-\lambda 2| \leqq 30\ nm$$

wherein λ1 denotes the maximum absorption wavelength of the ink, and λ2 is the maximum absorption wavelength of an area printed with the ink on a recording medium comprising a substrate and an ink-receiving layer thereon which comprises an alumina hydrate as a main component and, as a binder, alkali-processed gelatin.

42. A print obtained by conducting printing with ink dots on a recording medium comprising a substrate and an ink-receiving layer thereon which comprises an alumina hydrate as a main component and, as a binder, alkali-processed gelatin, wherein a glossiness Gs1 (60) of a non-printed area and a glossiness Gs2 (60) of a printed area are both at least 40 as measured in accordance with JIS Z 8741.

43. A print obtained by conducting printing with ink dots on a recording medium comprising a substrate and an ink-receiving layer thereon which comprises an alumina hydrate as a main component and, as a binder, alkali-processed gelatin, wherein the print satisifies the following relationship:

$$|Gs1\ (60)-Gs2\ (60)| \leqq 20$$

wherein Gs1 (60) and Gs2 (60) denote a glossiness of a non-printed area and a glossiness of a printed area, respectively, as measured in accordance with JISZ 8741.

* * * * *

UNITED STATES PATENT AND TRADEMARK OFFICE

CERTIFICATE OF CORRECTION

PATENT NO. : 5,738,932

DATED : April 14, 1998

INVENTORS : YUJI KONDO, ET AL.

It is certified that error appears in the above-identified patent and that said Letters Patent is hereby corrected as shown below:

COVER PAGE [56] REFERENCES CITED - FOREIGN PATENT DOCUMENTS,
Line 9, "2276670" should read --2-276670--.

COLUMN 1,
Line 32, "make" should read --making--;
Line 49, "higher" should read --better--;
Line 57, "sheet 1" should read --sheet--.

COLUMN 2,
Line 36, "productive problems that" should read --production in that--.

COLUMN 3,
Line 9, "be" should be deleted.

COLUMN 4,
Line 21, "achieved" should read --achieve--;
Line 65, "spectrum" should read --wavelength--; and
Line 66, "spectrum" should read --wavelength--.

COLUMN 5,
Line 40, "is" should read --is of--.

COLUMN 6,
Line 4, "born" should read --horn--;
Line 19, "born" should read --horn--; and
Line 63, "becomes a failure" should read --fails--.

UNITED STATES PATENT AND TRADEMARK OFFICE
CERTIFICATE OF CORRECTION

PATENT NO. : 5,738,932

DATED : April 14, 1998

INVENTORS : YUJI KONDO, ET AL.

It is certified that error appears in the above-identified patent and that said Letters Patent is hereby corrected as shown below:

COLUMN 7,
Line 14, "becomes a failure" should read --fails--.

COLUMN 8,
Line 35, "becomes a failure" should read --fails--;
Line 53, "becomes a failure" should read --fails--; and
Line 61, "passign" should read --passing--.

COLUMN 10,
Line 3, "starch, amine" should read --starch amine--.

COLUMN 11,
Line 7, "alkali processed" should read --alkali-processed--; and
Line 48, "electron-acceptable" should read --electron-accepting--.

COLUMN 12,
Line 20, "point" should read --viewpoint--; and
Line 33, "a" should read --the--.

COLUMN 13,
Line 6, "makes" should read --make--.

UNITED STATES PATENT AND TRADEMARK OFFICE

CERTIFICATE OF CORRECTION

PATENT NO. : 5,738,932

DATED : April 14, 1998

INVENTORS : YUJI KONDO, ET AL.

It is certified that error appears in the above-identified patent and that said Letters Patent is hereby corrected as shown below:

COLUMN 16,
Line 43, "low" should read --lower--.

COLUMN 18,
Line 54, "reduces" should read --is reduced--.

COLUMN 19,
Line 57, "more" should read --greater--.

COLUMN 21,
Line 24, "comprises" should read --comprise--.

COLUMN 22,
Line 42, "spectrum" should read --wavelength--;
Line 43, "spectrum" should read --wavelength--; and
Line 57, "$H^+$ acceptability" should read --$H^+$-accepting ability--.

COLUMN 24,
Line 26, "6(⅔)" should read --6 ⅔--;
Line 40, "an" should read --a--; and
Line 41, "1 1%" should read --1 %.

COLUMN 26,
Line 13, "Viscosity" should read --viscosity--.

UNITED STATES PATENT AND TRADEMARK OFFICE
CERTIFICATE OF CORRECTION

PATENT NO. : 5,738,932

DATED : April 14, 1998

INVENTORS : YUJI KONDO, ET AL.

It is certified that error appears in the above-identified patent and that said Letters Patent is hereby corrected as shown below:

COLUMN 27,
Line 14, "magent" should read --magenta--;
Line 54, "spectra" should read --wavelengths--;
Line 57, "spectra" should read --wavelengths--; and
Line 61, "spectra" should read --wavelengths--.

COLUMN 28,
Line 9, "spectra" should read --wavelengths--;
Line 26, "metaseparatshown" should read --metal ions shown--;
Line 40, "methal" should read --metal--; and
Line 43, "Example" should read --Examples--.

COLUMN 34,
Line 54, "CDDEFFFFFFGGGHHAA" should read --CDDEEFFFFFFGGGHHAA--.

COLUMN 35,
Line 19, "612.0" should read --61.0--;
Line 20, "C" should read --ΔλC--;
Line 21, "M" should read --ΔλM--; and
Line 27, "solgel" should read --sol-gel--.

COLUMN 37,
Line 3, "to" (second occurrence) should be deleted.

UNITED STATES PATENT AND TRADEMARK OFFICE
CERTIFICATE OF CORRECTION

PATENT NO. : 5,738,932

DATED : April 14, 1998

INVENTORS : YUJI KONDO, ET AL.

It is certified that error appears in the above-identified patent and that said Letters Patent is hereby corrected as shown below:

COLUMN 39,
Line 18, "meidum" should read --medium--; and
Line 19, "subtrate" should read --substrate--.

Signed and Sealed this

Second Day of November, 1999

Attest:

Q. TODD DICKINSON

Attesting Officer

*Acting Commissioner of Patents and Trademarks*